(12) United States Patent
Iyer

(10) Patent No.: US 11,649,801 B2
(45) Date of Patent: May 16, 2023

(54) SYSTEM AND METHOD OF CAPTURING AND LINEARIZING OCEANIC WAVE MOTION USING A BUOY FLOTATION DEVICE AND AN ALTERNATING-TO-DIRECT MOTION CONVERTER

(71) Applicant: Narayan R Iyer, Cedar Rapids, IA (US)

(72) Inventor: Narayan R Iyer, Cedar Rapids, IA (US)

(*) Notice: Subject to any disclaimer, the term of this patent is extended or adjusted under 35 U.S.C. 154(b) by 31 days.

(21) Appl. No.: 17/388,559

(22) Filed: Jul. 29, 2021

(65) Prior Publication Data

US 2022/0049678 A1 Feb. 17, 2022

Related U.S. Application Data

(60) Provisional application No. 63/201,173, filed on Apr. 15, 2021, provisional application No. 63/200,015, (Continued)

(51) Int. Cl.
| | | |
|---|---|---|
| *F03B 13/18* | (2006.01) | |
| *F16D 41/12* | (2006.01) | |
| *F03B 13/10* | (2006.01) | |

(52) U.S. Cl.
CPC ............ *F03B 13/186* (2013.01); *F03B 13/10* (2013.01); *F16D 41/12* (2013.01); (Continued)

(58) Field of Classification Search
CPC ...... F16H 63/3425; F16H 21/10; F16H 21/12; F16H 21/16; F16H 21/40; F16H 21/44; F16H 37/122; F16H 37/124; F16H 3/002; F16H 29/02; F16H 29/12; F16H 29/00; F16H 31/00; F16H 31/001; F16H 31/003; F16H 31/005; F16H 31/007; F16H 33/02; F16H 33/20; F16H 1/003; F16H 2035/005; F16H 2035/006; F16H 37/06;
(Continued)

(56) References Cited

U.S. PATENT DOCUMENTS

| | | | |
|---|---|---|---|
| 3,824,869 | A | 7/1974 | Murphy |
| 4,228,360 | A | 10/1980 | Navarro |

(Continued)

FOREIGN PATENT DOCUMENTS

| | | |
|---|---|---|
| CN | 203702437 U | 7/2014 |
| CN | 203742887 U | 7/2014 |

(Continued)

OTHER PUBLICATIONS

PCT/US21/44487—International Search Report and Written Opinion dated Nov. 10, 2021.

*Primary Examiner* — Mickey H France
(74) *Attorney, Agent, or Firm* — Hamilton IP Law, PC.; Jay R. Hamilton

(57) ABSTRACT

A method and system are disclosed which provides for power generation from oceanic wave motion which utilize: a double concave sided buoy flotation device, a recoil mechanism, an alternating-to-direct motion converter with gears having gravitational unidirectional collapsible teeth thereon and an underwater ramp to direct waves toward the buoy.

18 Claims, 24 Drawing Sheets

Related U.S. Application Data filed on Feb. 9, 2021, provisional application No. 63/136,284, filed on Jan. 12, 2021, provisional application No. 63/065,779, filed on Aug. 14, 2020.

(52) U.S. Cl.
CPC ... *F05B 2240/97* (2013.01); *F05B 2260/4031* (2013.01); *Y02E 10/20* (2013.01); *Y02E 10/30* (2013.01)

(58) Field of Classification Search
CPC .... F16H 37/065; F16H 37/08; F16H 37/0806; F16H 37/0813; F16H 37/0833; F16H 37/12; F16H 51/00; F16H 51/02; F16H 55/0833; F16D 41/12; F16D 41/30; F16D 3/18; F16D 11/06; F03B 13/12–268
USPC ...... 192/43.1, 43.2; 290/42, 53; 60/495–507
See application file for complete search history.

(56) References Cited

U.S. PATENT DOCUMENTS

| | | | |
|---|---|---|---|
| 4,257,519 A | | 3/1981 | Leach |
| 4,392,060 A | * | 7/1983 | Ivy ................. F03B 13/186 60/507 |
| 6,299,558 B1 | | 10/2001 | Jensen |
| 6,779,422 B2 | | 8/2004 | Chen |
| 6,825,574 B1 | | 11/2004 | Mooring |
| 7,891,183 B2 | | 2/2011 | Al-Huwaider |
| 8,487,459 B2 | | 7/2013 | Eder et al. |
| 9,309,860 B2 | | 4/2016 | Hon |
| 9,938,956 B2 | | 4/2018 | Patel |
| 9,995,269 B2 | | 6/2018 | Sung et al. |
| 10,591,634 B2 | | 3/2020 | Maguire-Boyle et al. |
| 10,704,616 B2 | | 7/2020 | Hsieh |
| 2006/0028026 A1 | | 2/2006 | Yim |
| 2009/0072540 A1 | * | 3/2009 | McCague ......... F03B 13/186 290/53 |
| 2010/0025999 A1 | * | 2/2010 | Kim .................. F03B 13/14 290/53 |
| 2010/0327595 A1 | | 12/2010 | Göttler |
| 2012/0085089 A1 | * | 4/2012 | Kuo .................. F03B 13/14 60/507 |
| 2012/0152682 A1 | | 6/2012 | Tien et al. |
| 2012/0235413 A1 | | 9/2012 | Piccinini |
| 2013/0009402 A1 | | 1/2013 | Williams |
| 2013/0025993 A1 | | 1/2013 | Lin |
| 2013/0269333 A1 | | 10/2013 | Williams et al. |
| 2013/0283778 A1 | * | 10/2013 | Dicembrino ....... F03B 13/1815 60/501 |
| 2014/0217737 A1 | | 8/2014 | Castillo |
| 2014/0360176 A1 | * | 12/2014 | Wu .................. F03B 13/1815 60/505 |
| 2015/0035283 A1 | | 2/2015 | Lee |
| 2015/0091305 A1 | * | 4/2015 | Ko ..................... F03B 13/264 290/54 |
| 2015/0275847 A1 | | 10/2015 | Sung et al. |
| 2017/0045119 A1 | * | 2/2017 | Rodriguez Ramirez . F16H 3/10 |
| 2017/0114864 A1 | * | 4/2017 | Morselli ........... F16H 55/0806 |
| 2018/0156312 A1 | * | 6/2018 | Wang ................. F16H 1/06 |
| 2018/0245563 A1 | * | 8/2018 | Avadhuta ......... F03B 13/186 |
| 2019/0024622 A1 | | 1/2019 | Sung |
| 2020/0191111 A1 | | 6/2020 | Farb et al. |
| 2020/0347817 A1 | | 11/2020 | Lee et al. |

FOREIGN PATENT DOCUMENTS

| | | | | |
|---|---|---|---|---|
| CN | 103867374 B | | 8/2016 | |
| CN | 111502901 A | | 8/2020 | |
| CN | 111535982 A | | 8/2020 | |
| CN | 111677618 A | | 9/2020 | |
| DE | 102012021666 A1 | | 12/2013 | |
| FR | 2474601 A | * | 7/1981 | ............ B63H 19/02 |
| GB | 1515744 A | * | 6/1978 | ............ F03B 13/186 |
| GB | 2255807 A | | 11/1992 | |
| WO | 195515449 A1 | | 6/1995 | |
| WO | 2003098033 A1 | | 11/2003 | |
| WO | 2005005821 A1 | | 1/2005 | |

\* cited by examiner

SYSTEM AND METHOD OF CAPTURING AND LINEARIZING OCEANIC WAVE MOTION USING A BUOY FLOTATION DEVICE AND AN ALTERNATING-TO-DIRECT MOTION CONVERTER

CROSS REFERENCE TO RELATED APPLICATIONS

This application is a non-provisional patent application which claims the benefit of four provisional patent applications: having Ser. No. 63/065,779, which was filed on Aug. 14, 2020; having Ser. No. 63/136,284, which was filed on Jan. 12, 2021; having Ser. No. 63/200,015, which was filed on Feb. 9, 2021; and having Ser. No. 63/201,173, which was filed on Apr. 15, 2021; all of these provisional applications are incorporated herein in their entirety by this reference.

FIELD OF THE INVENTION

The present invention generally relates to a system and method of extracting oceanic wave motion using a flotation device, a recoil mechanism to restore said flotation device to an original position, and an alternating-to-direct motion converter, in order to capture and linearize oceanic motion for the consistent generation of power including electricity.

BACKGROUND OF THE INVENTION

In the past, many power generation methods have been proposed which involve using oceanic wave motion. One system is described in U.S. Pat. No. 9,995,269 issued to Sung et al on Jun. 12, 2018. One shortcoming of this system is that it uses a motion conversion mechanism that is highly intricate to manufacture, with a variety of moving materials, leading to increased inefficiency, mechanical wear and maintenance burdens. Another shortcoming of this system is that it is confined to using two tensile force transmitting members extending from a buoy to the sea floor. This can initiate extra expense, especially in deep sea operations.

Numerous past methods have attempted to provide unidirectional motion by transmitting one direction of motion (such as buoy rise) as output, but blocking the other direction (buoy fall) from being transmitted as the output of said method; this method or associated apparatus does not meet the criteria defined for an Alternating to Direct Motion Converter, ADMC, described in this document, that converts both directions of bidirectional motion to unidirectional motion. Additionally, Prior ADMCs known in the art are intricate to build, with a high variety of moving parts, susceptible to frequent wear and decreased efficiency.

Numerous unique systems have been proposed and patented. Yet, extracting oceanic wave motion is still not commonplace. Each design presents its own significant challenges.

Consequently, there still exists a need for improved methods and systems for efficiently and economically generating power by using oceanic wave motion.

SUMMARY OF THE INVENTION

It is an object of the present invention to provide an efficient power generation system using oceanic wave motion.

It is an advantage of the present invention to provide for economical systems for use near shore or in deep water.

It is another feature of the present invention to provide a mechanism to capture both directions of a bidirectional movement for conversion to unidirectional motion, with said mechanism referred to as an Alternating to Direct Motion Converter (ADMC).

It is another advantage of the present invention to extract more motion by converting both directions of a bidirectional movement to unidirectional motion using an Alternating to Direct Motion Converter (ADMC).

It is another feature of the present invention to provide an Alternating to Direct Motion Converter (ADMC), with unidirectional collapsible gear teeth with gravitationally self-erecting teeth, that collapse in one direction when pushed by a transmitting member, while remaining erect when pushed in the other direction, and with said ADMC parts positioned in a manner to appropriately facilitate the use of said gravitationally self-erecting teeth.

It is another advantage to allow for avoidance of design, development and maintenance complications inherent with a need to use torsional or elastic forces to re-erect the collapsible teeth.

It is another feature of the present invention to provide a buoy with one or more concave faces that catches wave motion components against said faces.

It is another advantage of the present invention to allow for greater capture of horizontal wave motion force components in addition to vertical buoyancy forces.

The present invention is an apparatus and system for efficiently and economically generating power by extracting oceanic wave motion which is designed to satisfy the aforementioned needs, provide the previously stated objects, include the above-listed features, and achieve the already articulated advantages. The present invention is carried out in an "internal tooth re-erecting force-less" manner, in a sense that only gravitational forces are involved in re-erection of collapsible teeth.

Accordingly, the present invention is a method of converting alternating, bi-directional motion to unidirectional motion comprising the steps of:
  providing a master input member configured to move in alternating directions;
  providing a first receiving shaft;
  providing a second receiving shaft;
  providing a plurality of unidirectional collapsible gear teeth;
  where said plurality of unidirectional collapsible gear teeth form an interface between the master input member; and
  the first receiving shaft; and
  the second receiving shaft;
  where each of said plurality of unidirectional collapsible gear teeth:
    collapse when pushed in a first direction relative to a tooth;
    remain erect when pushed in a second direction relative to the tooth;
    are disposed on at least one of a first gear and a second gear; and
    where the master input member, the first receiving shaft, the second receiving shaft, the first gear, the second gear, and the plurality of unidirectional collapsible gear teeth, in combination, are configured such that:
      a movement of the master input member in a first direction causes contact-induced collapse of unidirectional collapsible teeth between the master input member and the second receiving shaft, while transferring motion, via erect unidirectional collapsible teeth, to the first receiving shaft; and a movement of the master input member in a second direction causes contact-induced collapse of unidirectional collapsible teeth between the master input member and the first receiving shaft, while transferring motion, via erect unidirectional collapsible teeth, to the second receiving shaft.

Additionally, the present invention is a system including a power generating system using oceanic wave motion, comprising:

a buoy with a first concave portion, that catches a wave as it moves toward a first direction;

a mechanism to restore the buoy back to an original state, after the wave passes the buoy and a wave charge force subsides;

wherein the mechanism can be any of a spring, a hydraulic mechanism, and a weightlifting mechanism configured for accumulating energy and automatic releasing energy once energy accumulation subsides;

a tensile member connected with the buoy and said mechanism;

an alternating to direct motion converter for conversion of the alternating motion into unidirectional motion;

wherein said alternating to direct motion converter comprises:

a master input member configured to move in alternating directions;

a first receiving shaft;

a second receiving shaft;

a plurality of unidirectional collapsible gear teeth;

where said plurality of unidirectional collapsible gear teeth form an interface between the master input member; and the first receiving shaft; and the second receiving shaft;

where each of said plurality of unidirectional collapsible gear teeth:

collapse when pushed in a first direction relative to a tooth;

remain erect when pushed in a second direction relative to the tooth;

are disposed on at least one of a first gear and a second gear; and where the master input member, the first receiving shaft, the second receiving shaft, the first gear, the second gear, and the plurality of unidirectional collapsible gear teeth, in combination, are configured such that:

a movement of the master input member in a first direction causes contact-induced collapse of unidirectional collapsible teeth between the master input member and the second receiving shaft, while transferring motion, via erect unidirectional collapsible teeth, from the master input member to the first receiving shaft; and a movement of the master input member in a second direction causes contact-induced collapse of unidirectional collapsible teeth between the master input member and the first receiving shaft, while transferring motion, via erect unidirectional collapsible teeth, from the master input member to the second receiving shaft;

any of the plurality of unidirectional collapsible teeth becomes erect under its own weight prior to encounter with non-unidirectional collapsible teeth;

transmitting a unidirectional motion to at least one of:
an energy storage apparatus;
an electric generator for generation of electricity; and
a centrifugal water pump for further desalination methods; and,
providing an underwater ramp secured to earth at a location so that waves are directed by the underwater ramp toward the buoy.

BRIEF DESCRIPTION OF THE DRAWINGS

The invention may be more fully understood by reading the description of the preferred embodiments of the invention, in conjunction with the appended drawings wherein.

DETAILED DESCRIPTION

Although described with particular reference to oceanic wave motion extraction, the systems and methods of the present invention could be implemented in other applications.

The details below should be viewed as examples of many potential variations of the present invention which are protected hereunder.

Introduction

The present invention is a system and method of extracting oceanic wave motion using a buoy flotation device, a strategically mounted recoil mechanism, and an alternating-to-direct motion converter, in order to capture and linearize oceanic motion for the consistent storage and generation of electricity. The known prior art allows us to extract/store electricity effectively from sources that are of unidirectional motion, and the present invention linearizes Oceanic motion into a single direction, for use with many existing technologies. An embodiment of the present invention can be grouped into three major parts:

The Wave Interface (Part 1)
Alternating to Direct Motion Converter (ADMC) (Part 2)
Energy Storage Methods that can Use this Invention (Part 3)

Figure 1:
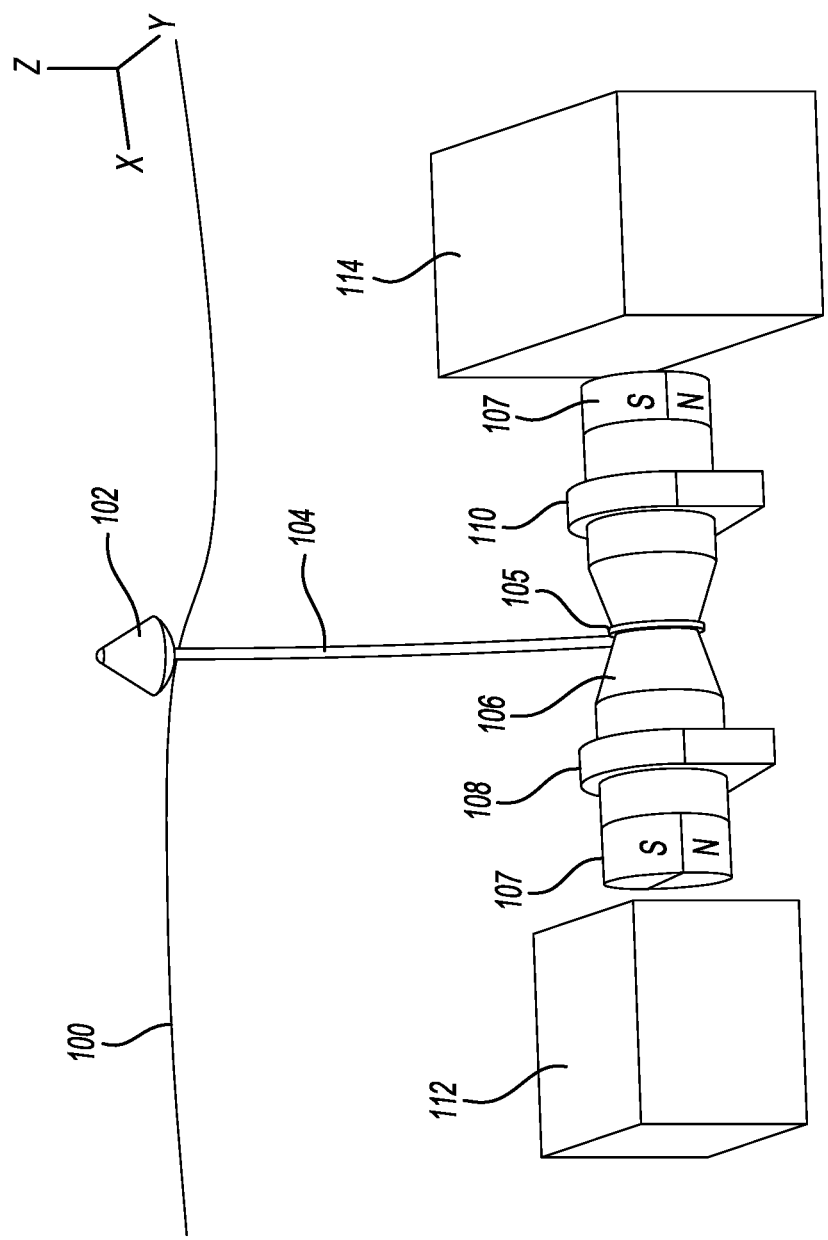
FIG. 1 is a simplified perspective view of the present invention.

Now referring to FIG. 1, there is shown a perspective view of the present invention, in its intended oceanic environment where the ocean body 100 is displayed.

Brief Introduction of the Wave Interface (Part 1)

The wave interface comprises a buoy 102 with high buoyancy that is attached to a rope 104 wound around an underwater shaft ("Main Shaft 106"). The main shaft, in turn, is preferably coupled to a torsional/spiral spring unit 112 on one end, and Part 2 generally designated 114, on the other end. The buoy 102 and rope 104 power the rotation of the main shaft 106 when the buoy is pulled (crest/front of the wave), the spring unit 112 then powers the rotation of the main shaft 106 when the pulling force subsides (trough or back of the wave). The un-springed end of the main shaft shall transmit rotational motion to Part 2 of the system. The mechanism of the Wave Interface (Part 1) allows the multi-directional nature of oceanic waves (up, down and side to side) to be converted to a bi-directional motion (clockwise and counterclockwise).

Brief Introduction of Alternating-to-Direct Motion Converter (ADMC) (Part 2)

Part 2 of the system (shown in FIG. 1 as a simple block representation) is the location of the Alternating-to-Direct Motion Converter and comprises a system of three main gears. One being the Master Gear, and two Receiving Gears that selectively rotate when the Master Gear rotates in their individually assigned direction; this is made possible by the use of collapsible unidirectional gear teeth on the Receiving Gears that function to move the Receiving Gear in a first direction, but collapse when the gear is pushed in the other direction. The mechanism of Part 2 allows the bi-directional motion from Part 1 to be selectively transferred to separate gears (and their corresponding shafts), which will then provide a unidirectional motion. In the preferred embodiment, the unidirectional collapsible teeth are gravitationally self-erecting, and the gears strategically are arranged to allow said erection before adjacent gear interactions occur.

Effectively, the mechanisms in Parts 1 and 2 work together to harness and convert the erratic and multi-directional motions of oceanic waves to a unidirectional motion. This unidirectional motion can then be stored and used to generate clean and consistent electricity.

Brief Introduction of Energy Storage Methods that can Use this Invention (Part 3)

Part 3 of this description briefly mentions how this invention can be used with existing technologies to store energy. The unidirectional rotary motion output by Part 2 can be utilized in many ways, such as an input into an electric generator, a pump, a conveying system, a flywheel etc.

More Detailed Description of the Wave Interface (Part 1)

Generally, ocean waves charging toward the shore will lift the buoy 102 up and toward the shore, which will cause the rope 104 to be pulled upward and away from the main shaft 106 and cause the shaft to spin in a first direction. When the shaft spins due to the pulling of the buoy 102, the Torsional/Spiral Spring, or other recoil mechanism 112 must be set up to increase in potential energy (energize the spring). Then, once the wave passes and the Buoy 102 reaches the trough of the wave and/or the wave retreats, the pulling force subsides and the spring will immediately power the reverse rotational motion of the main shaft 106 and remove any slack in the rope 104, thus causing the shaft to rotate back in a second direction, reverse of the first, and returning the buoy to an original position to encounter the next wave.

As can be seen from FIG. 1, the rope 104 is wound around the narrowed section 105 of the Main Shaft 106; this allows for the maximization of the shaft's rotational velocity and displacement.

Magnetic Shaft Tips

Now referring back to FIG. 1, the magnetic shaft tips 107 allow for the Main Shaft 106 to transmit rotational motion to unit shafts without any physical contact. This method allows for the transfer of rotational motion from a liquid medium (sea water) to a gaseous or vacuum medium (inside spring unit 112) without physical contact to allow for easier waterproofing.

Figure 2:
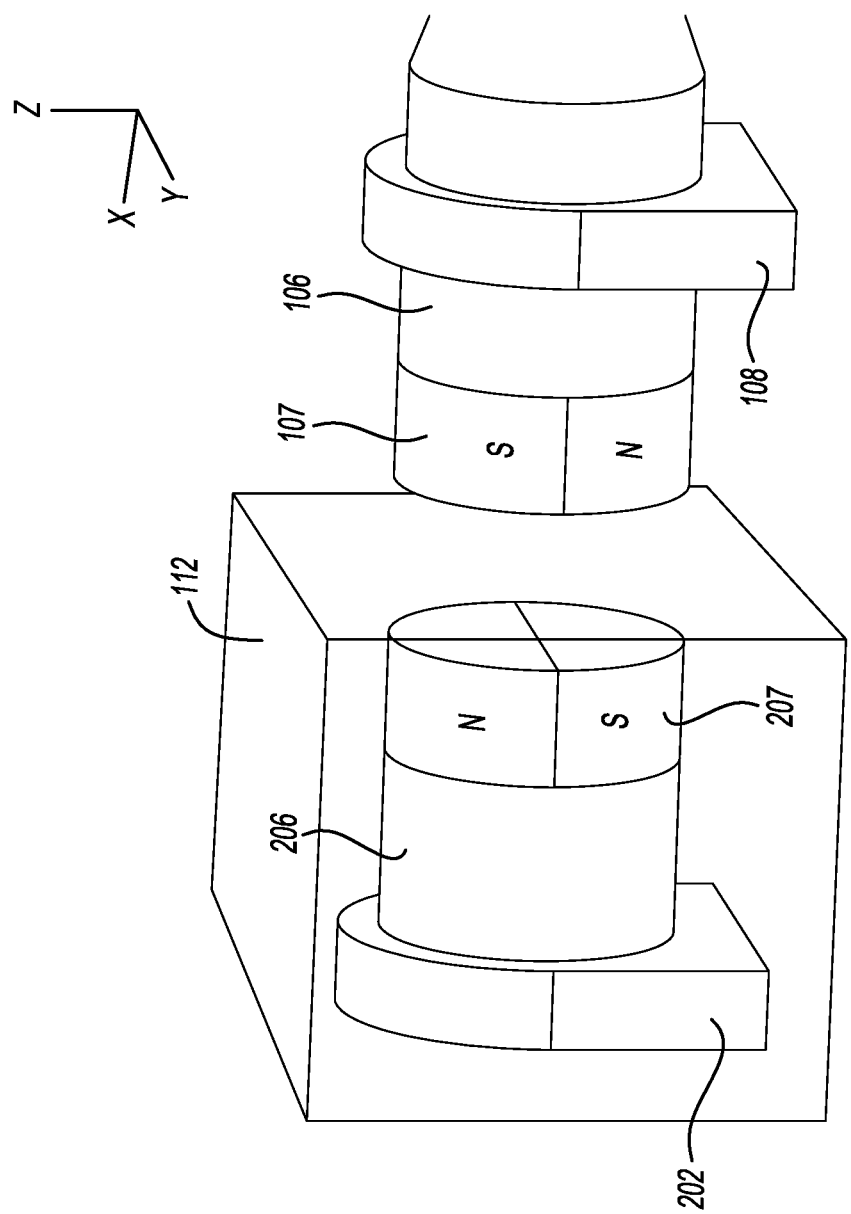
FIG. 2 is a perspective view of a portion of the present invention where an enclosure is shown as being transparent to aid in understanding its contents.

Now referring to FIG. 2, there is shown a perspective view of the spring unit 112 (shown as being transparent to aid understanding) and the magnetic connection to the main shaft 106.

The spring unit shaft 206, houses the spring which preferably is a spiral or torsional spring or any suitable spring for the particular application. Also shown are magnetic tips 207, configured with the inverted poles of the main shaft magnetic tips 107. The opposite poles between the two shafts will attract each other while the like poles will repel, thus enforcing this inverted configuration to be maintained at all times, thus transferring rotation between the shafts. This mechanism applies to both units on either side of the Main Shaft 106 (only one side is pictured in FIG. 2). Waterproofing will be especially important for the functionality in the Part 2 unit.

The attraction between the magnetic shaft tips 107 and 207 between the two shafts pictured in FIG. 2 will lead to lateral forces being exerted on the shafts. The specialized revolute joints 108 and 202 will prevent lateral movement of shafts 106 and 206, respectively, in the wave interface design.

In some embodiments, the magnetic strength and spacing between the main shaft 106 and unit shafts 206 and 306 (FIG. 3) shall be equal for both units 112 and 114 (on either side), this will allow for an equal but opposite pulling force on the main shaft by the unit shafts, thus effectively canceling each other out. In other words, there should be no resultant lateral force on the main shaft 106.

Revolute joints 202 and 108 only allow rotation about the x-axis, and no other movement. These revolute joints must be applied to the unit shafts, as well as the main shaft (in case there are external oceanic forces on the main shaft).

Figure 25:
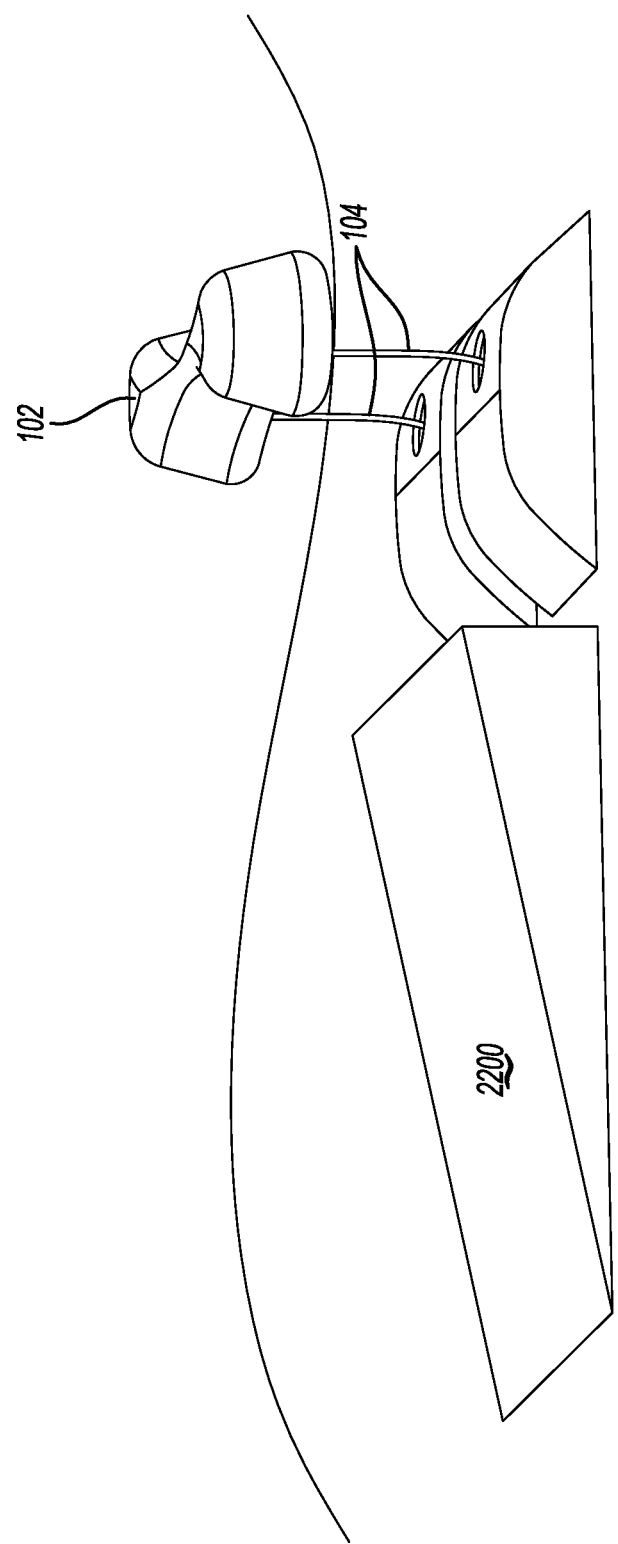
FIG. 25 is a perspective representation of the system of the present invention with a wave ramp.

The user may encase the entire wave interface, except the rope and buoy, with an outer shell casing in order to prevent external matter interfering with the magnets (FIG. 25).

Figure 16:
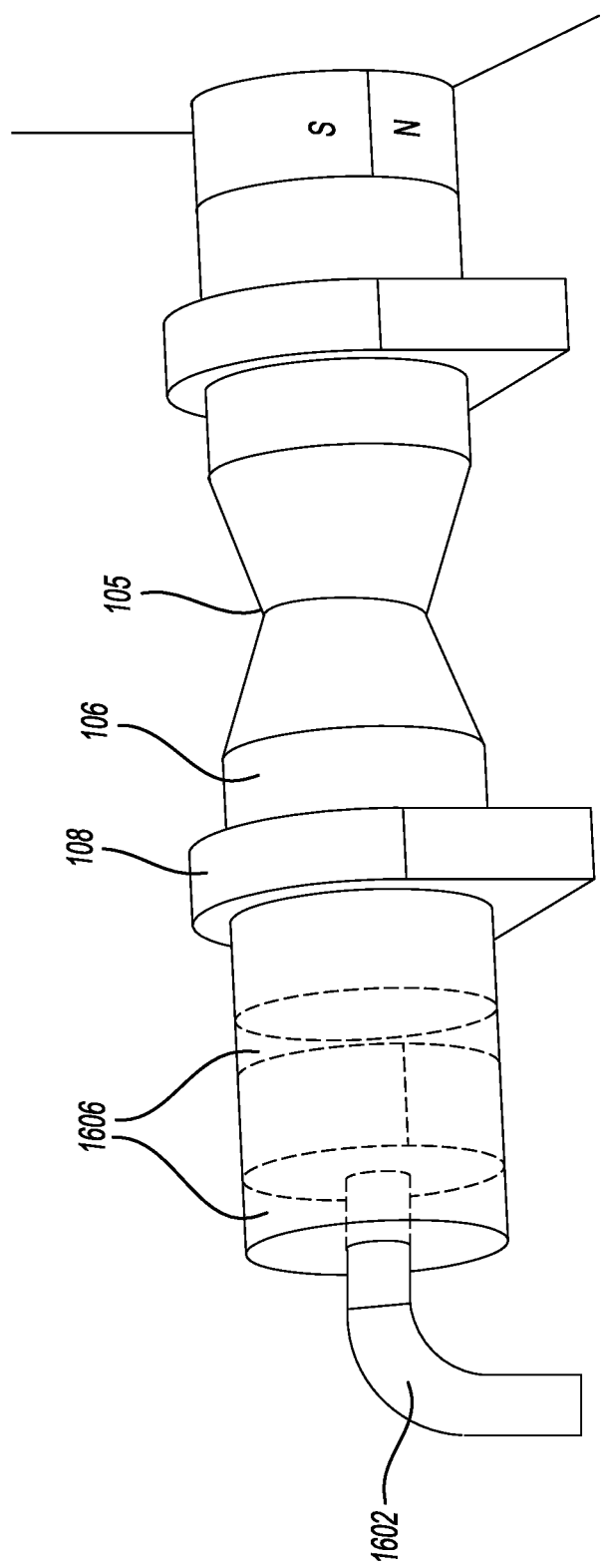
FIG. 16 is a perspective view of an alternate embodiment. The hollow shaft 1606 is made partially transparent for visibility of the internal structure.
Figure 26:
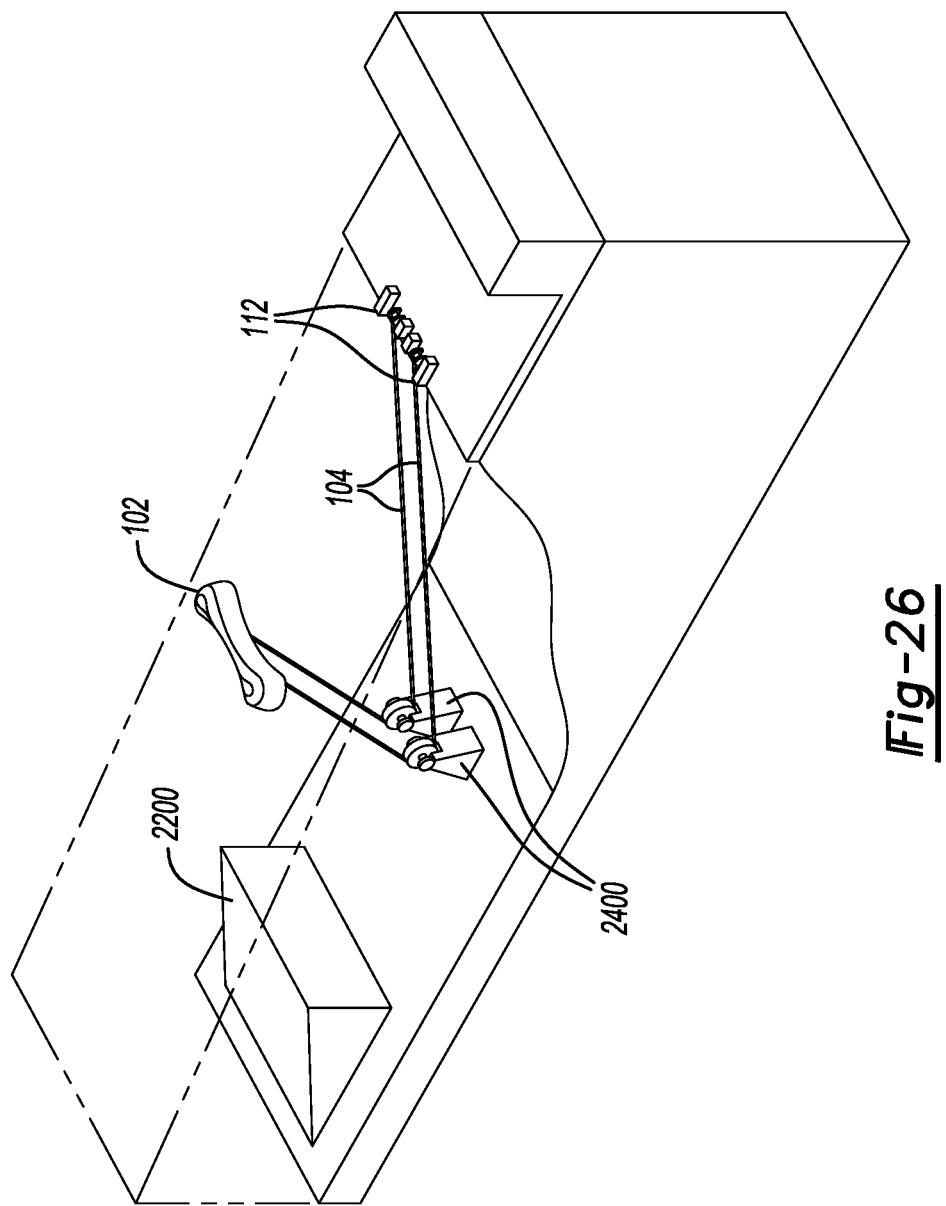
FIG. 26 is a perspective view of the present invention in an alternate environment, with the main shaft, Part 2 and Part 3 units being on-shore, the dashed-lines represent a body of water.
Figure 27:
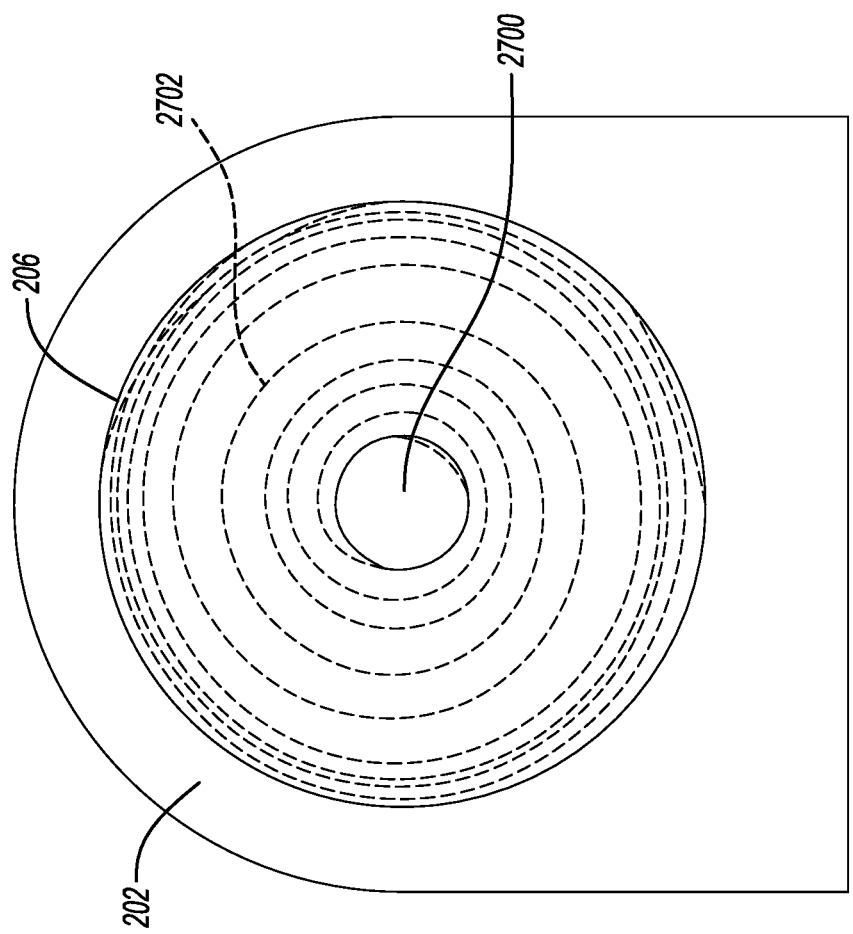
FIG. 27 is a close-up view of an embodiment of the Spring Unit inside a hollowed unit shaft 206.

Alternatively, if the user chooses not to use magnetic shaft tips, the user would have to build a single main shaft that stretches across the units, or have multiple shafts with physical connections but design waterproofing mechanisms between mediums while minimizing friction (FIG. 16). Otherwise the user could also use drive belts and/or pulleys to transfer motion from the main shaft to units placed elsewhere, above ground for instance as per FIG. 26.

The Ball Bearing Revolute Joints 108 and 110 allow the shaft 106 to rotate about the axial axis of the main shaft (x-axis in FIG. 1). These joints (and shaft) must be designed to not allow any other degrees of freedom other than rotation about the x-axis. No lateral movement of the main shaft shall be allowed. A more detailed understanding of these joints 108 and 110 can be understood by now referring to FIGS. 13, 14, and 15 which show details of one possible embodiment of a revolute joint.

Figure 13:
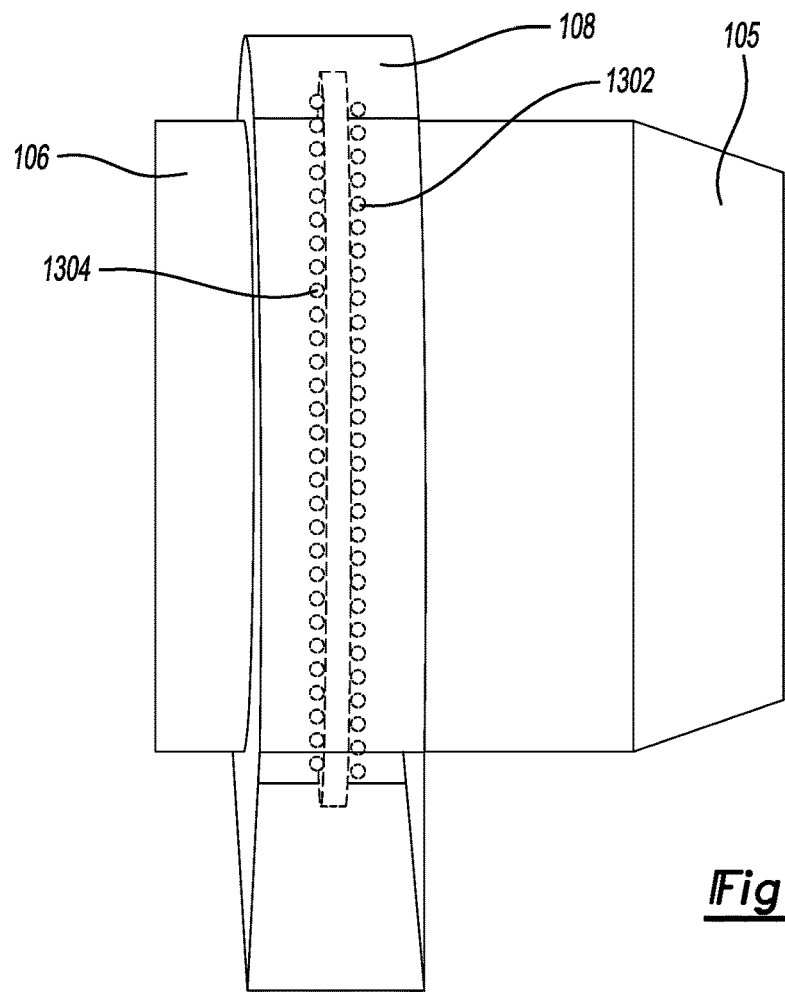
FIG. 13 is an elevation view of a portion of the main shaft of the present invention as well as a revolute joint shown in a partial transparent manner so as to expose two internal rings of balls.

More specifically, FIG. 13 is a transparent view of revolute joint 108, which includes a first ring of balls 1302 each in an associated ball housing and a parallel second ring of balls 1304. Numerous variations of this could be used depending upon the specific application.

Figure 14:
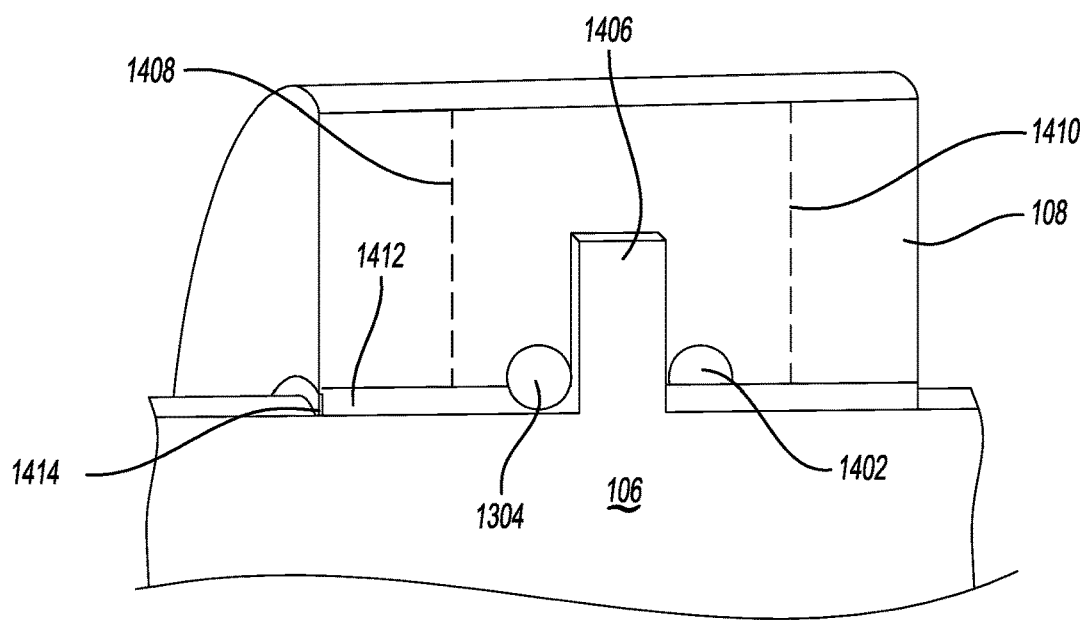
FIG. 14 is a cross-sectional view of a portion of the main shaft and revolute joint combination of FIG. 13, where the two parallel vertical dash lines represent a zone of magnetization.

Now referring to FIG. 14, which is a cross-sectional view of portions of the revolute joint 108 and main shaft 106, which shows one ball of the second ring of balls 1304 and an empty portion of an associated ball housing 1402 for the first ring of balls 1302.

The rings of balls 1302 and 1304 in FIGS. 13 and 14 face lateral and radial forces allowing for minimized surface friction due to the two forces. The seal 1414 is rigidly attached to the joint 108 and enters into void 1502 (FIG. 15) in the shaft body 106 without any contact with the shaft 106 (the balls will be the only contact between the shaft 106, main shaft extension 1406 and joint 108).

The user may use a magnet for the portion of the joint body as seen in the cross-section, between vertical dashed lines 1408 and 1410. This is to ensure that the ferrofluid lubricant (not shown) located in the gap 1412, remains amongst the balls. The balls and shaft 106 shall not be made of a magnetic material. If the ferrofluid constantly remains amongst the balls, ocean water will not be allowed to displace them, thus allowing the ball bearing system to remain waterproof. The seal 1414 allows for forceful sea water to remain out of the joint 108, and the ferrofluid and magnet attraction allows for seeping sea water to remain away from the balls, allowing them to remain lubricated. The ferrofluid shall not be water soluble.

The user also needs to ensure that the joint magnet and ferrofluids do not significantly interact with other magnets in the entire system.

Figure 15:
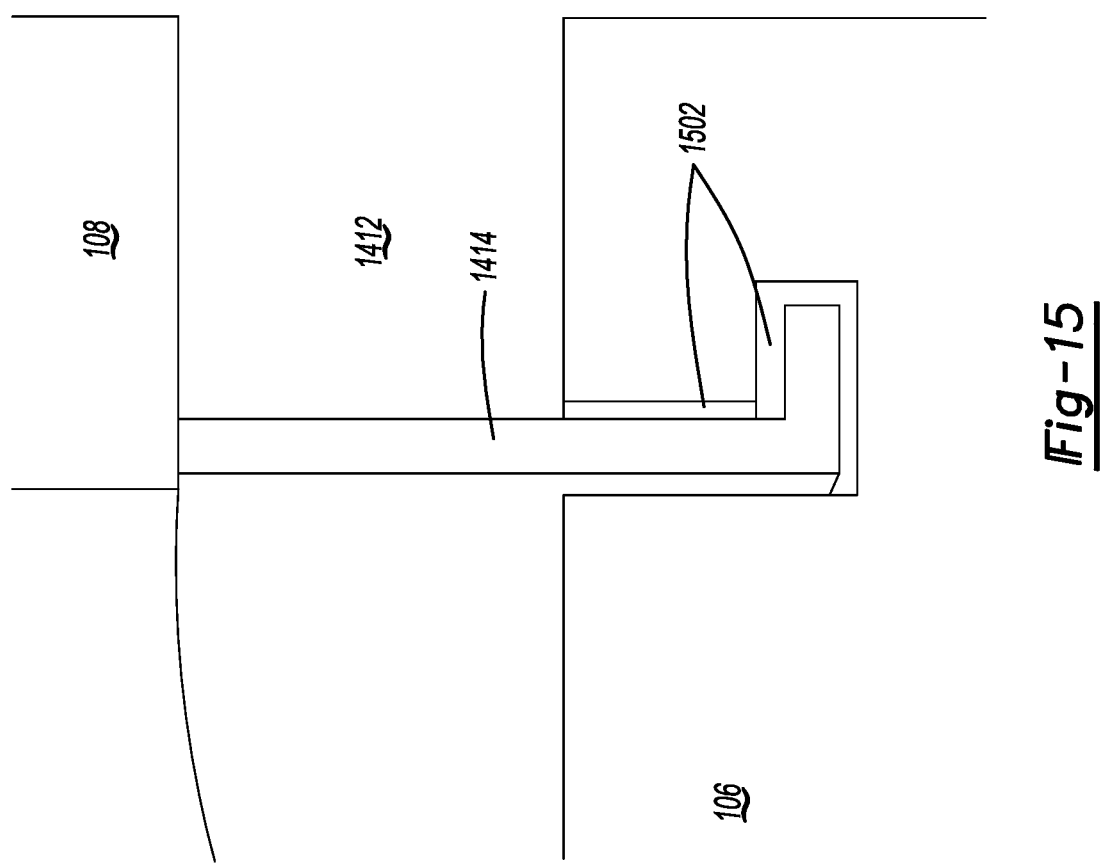
FIG. 15 is a close-up view of the seal 1414 portion of FIG. 13 and its surrounding structure.

Now referring to FIG. 15, there is shown a close-up view of the portion of cross-section view of FIG. 14 around the seal 1414.

Spring Unit

If the user implements magnetic transferal of rotational motion from the main shaft to units, it is important that the internal spring used is not made out of a magnetic metal. Recommended metals for the torsion or spiral spring and revolute joints:
Aluminum
Copper
Tin
Titanium
Or zinc.

It is also important to minimize the weight of all moving parts. This allows for the minimization of moment of inertia, thus maximizing angular velocity and displacement. The spring should be configured such that the pulling of the buoy energizes the spring.

As the buoy 102 encounters a wave crest and/or front, it is pulled away from the main shaft 106. The rope 104, or other suitable elongated tensile flexible member, wound around the main shaft 106 causes the main shaft 106 to spin.

This spin is transmitted to the unit shafts 206 and 306 magnetically (or physically if the user does not use magnetic tips).

Figure 28:
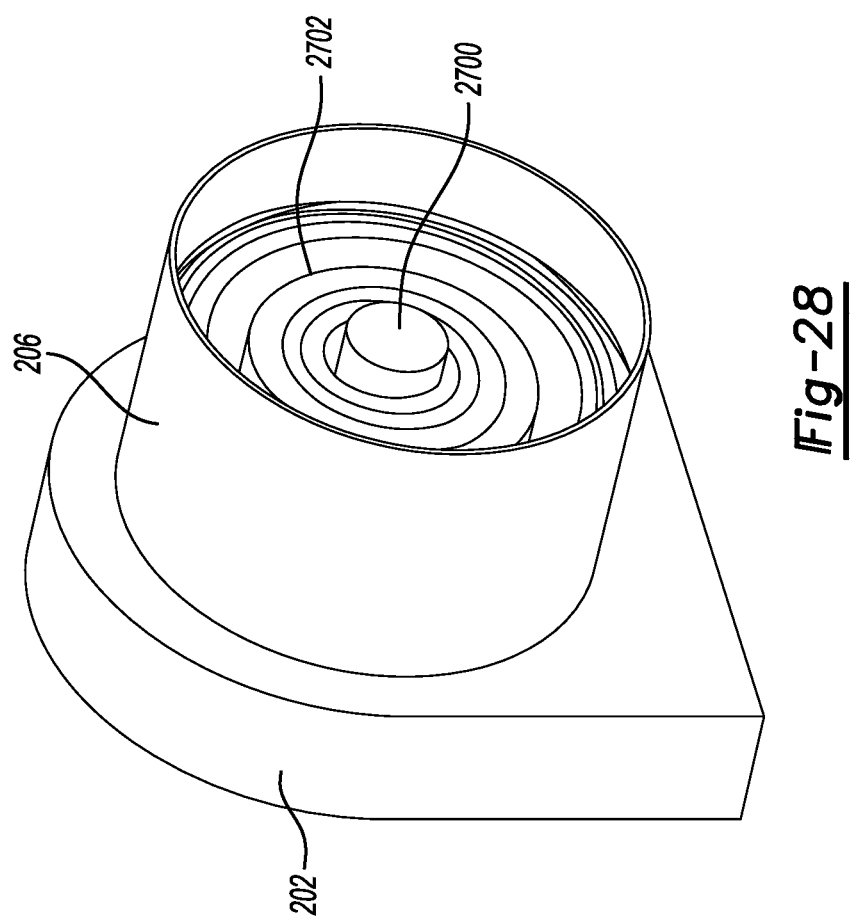
FIG. 28 is a perspective view of an embodiment of the Spring Unit.

Referring to FIG. 28 the spin manifests in the outer shell of the hollow shaft 206, which is rigidly connected to the moving end of a spiral spring 2702, causing it to be energized. Meanwhile, this spin is also transferred to Part 2 Unit 114 for motion linearization and energy storage.

As the wave then troughs and/or retreats, the pulling force on the buoy 102 subsides, and the energized spring 2702 causes the following events:

Reverse spin which is transmitted to the main shaft 106 through the shaft 206 and the magnetic shaft tips 207 and 107.

The reverse spin is also instantaneously transmitted to the Part 2 Unit 114 for motion transferring and eventual energy storage.

The reverse spin pulls the rope 104 back, thus removing slack, the buoy is pulled back to encounter the next wave.

The spring 2702 in hollowed shaft 206 can be a spiral or torsion spring. An alternate design to the spring unit is shown in FIG. 16. However, this design would require the user to implement alternate, potentially more challenging, waterproofing methods.

An alternative to a torsion or spiral spring would be a hydraulic mechanism configured to compress when the buoy is pulled away from the system and the rope unwinds, thus storing potential energy.

As the wave then troughs and/or retreats, the pulling force subsides and the energized hydraulic mechanism functions similarly to an energized spring, transmitting reverse spin to the main shaft 106 and the Part 2 unit, mitigating rope slack while pulling the buoy 102 back to encounter the next wave.

Another suitable alternative to a torsion or spiral spring would be a mechanism that lifts a heavy weight to store gravitational potential energy as the buoy is pulled away and the rope unwinds. Then, once wave forces subside, the weight drops, causing reverse spin in the main shaft 106 to be transmitted to the Part 2 unit 114, while mitigating rope slack when pulling the buoy 102 back to encounter the next wave.

Now referring to FIG. 16, there is shown an alternate embodiment without the revolute joint 202 in spring unit 112 of FIGS. 1 and 2. Instead a hollow shaft 1606 (made transparent for visibility), which is physically connected to the main shaft 106 and rotates with it, is shown. The curved core 1602 is grounded and does not move. A waterproofed revolute joint is needed to prevent water entering the hollow portion of the shaft.

The wave interface thus produces an alternating motion that is transferred to Part 2 of the system for motion linearization and eventual energy production.

Buoy Design

Figure 29:
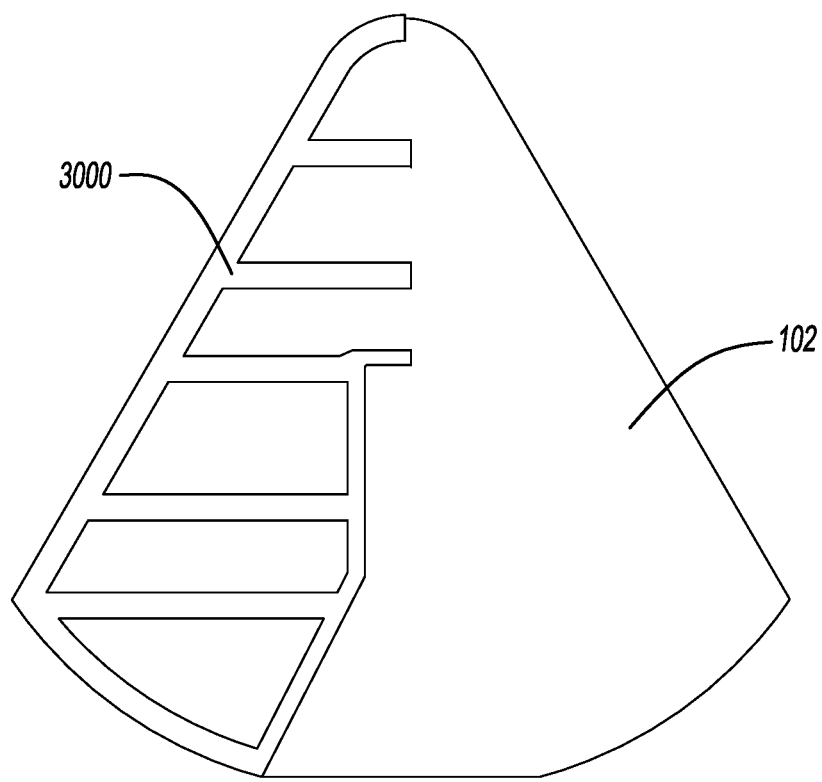
FIG. 29 is a full-sectional view of a buoy with compartmentalized air pockets.

Referring to FIG. 29, compartmentalization of the buoy 102 allows for separated air pockets 3000 which prevent excessive flooding of the buoy in case the outer shell structure is compromised at any point. This will reduce the probability of sinking during a breach of the buoy outer layer. This same compartmentalization concept shall be applicable to any of the alternate buoys stated herein.

Figure 17:
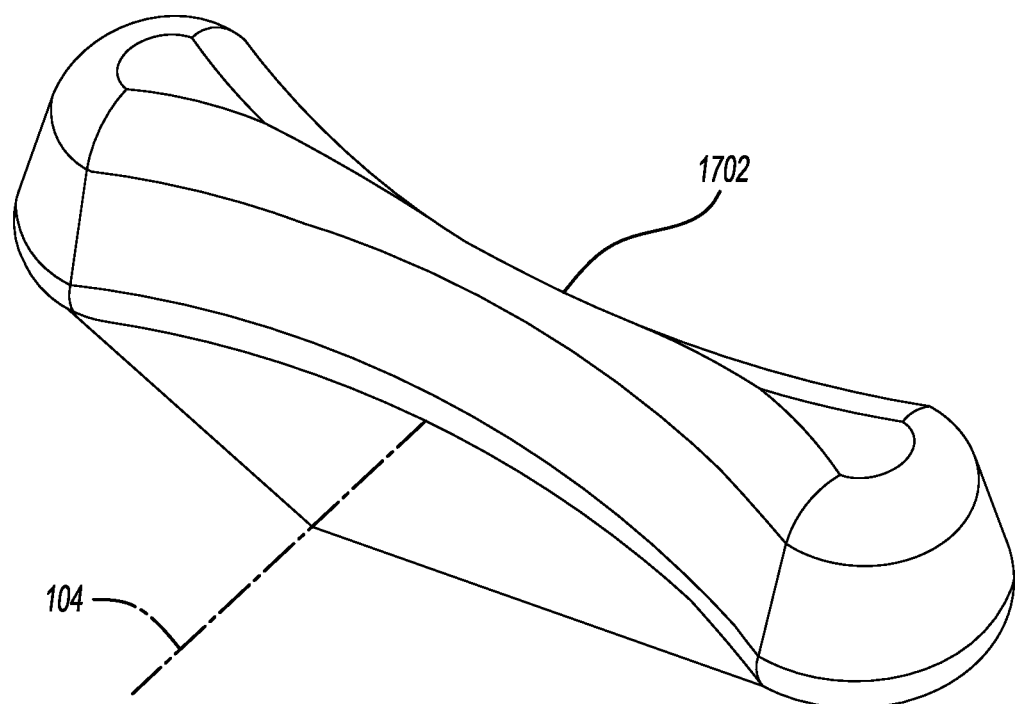
FIG. 17 is a perspective view of an alternate buoy embodiment of the present invention.

Now referring to FIG. 17, there is shown an alternate buoy design 1702 optimized to maximize the wave force encountered by the wave interface. This allows for a greater amount of movement as the waves move toward the shore and away from the shore. The features of this buoy are highlighted below:

a. Concave impact point (similar to a parachute) to allow for increased capture of horizontal wave force components.

b. More volume at the bottom of the buoy to allow for low CG and lower likelihood of tipping.

c. The rope 104 may need to have several mounting points to this buoy for stable motion to occur.

In another embodiment, the specialized concave buoy can be further optimized to harness more horizontal wave force components by comprising an extended underwater portion, further comprising a concave portion.

Figure 18:
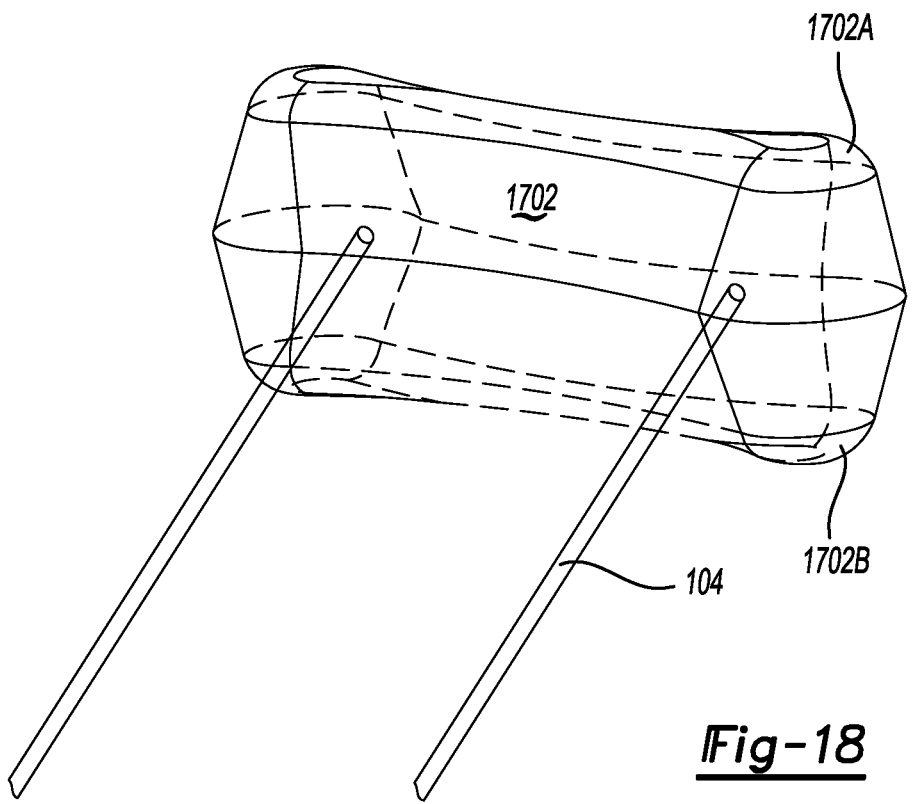
FIG. 18 is a perspective view of an alternate buoy embodiment of the present invention, where the buoy is partially submerged.

Thus referring to FIG. 18, there is shown an alternate buoy 1702 comprising an underwater portion 1702B and an above water portion 1702A, connected with the rest of the system by one or more tensile members (rope for instance) 104. The partial submergence can be facilitated by adding appropriate amounts of internal weight to 1702B such as sand or cement.

Now referring to FIG. 25, there is shown a system of the present invention where there is a ramp placed on the sea floor in a position to cause an increased swell of an incoming wave before reaching the buoy 102. The remainder of the system may be identical to those described elsewhere in this application. The system on the seafloor is shown in an enclosure with a hole therein for the rope 104 to pass therethrough. The enclosure helps protect the system from foreign matter. Since the Fibonacci sequence (or more appropriately known as the Pingala sequence) is the most efficient additive method of nature, the ramp used to increase wave swell prior to impacting the buoy may comprise a progressive height increase according to a variation of said sequence.

More Detailed Description of the
Alternating-to-Direct Motion Converter (ADMC)
(Part 2)

Figure 3:
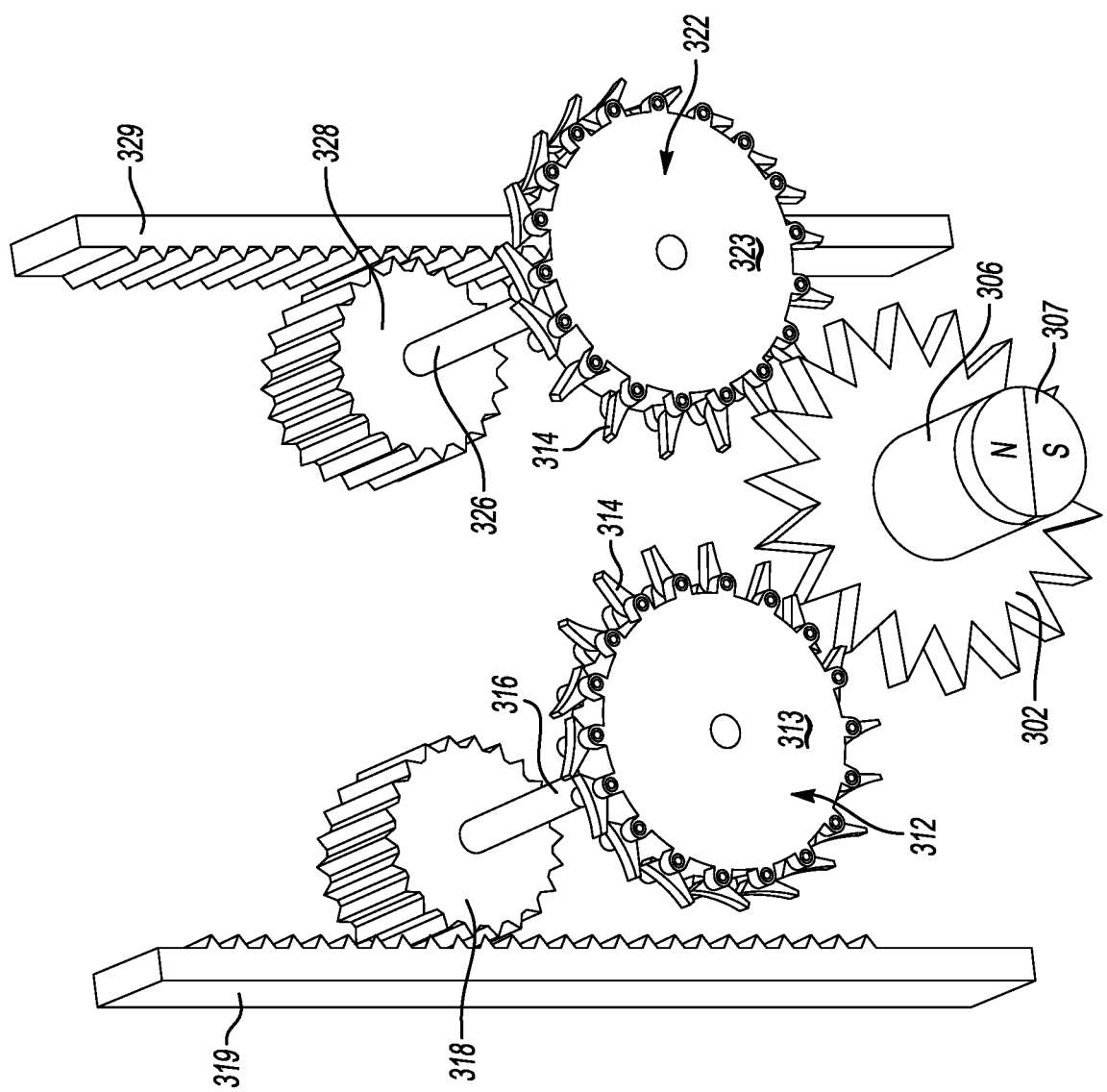
FIG. 3 is a perspective view of one embodiment of the Alternating to Direct Motion Converter (ADMC) portion of the present invention.

This part of the invention converts alternating motion from the main shaft 106 of the wave interface into unidirectional motion. FIG. 3 shows the overview of this system. This system separates the cyclical alternating motion of the unit shaft 306 to two separate Receiving Gear shafts 316 and 326 based on the direction of motion. In some embodiments, the separated unidirectional motion is unified by coupling of the receiving shafts (seen in FIG. 4).

Figure 5:
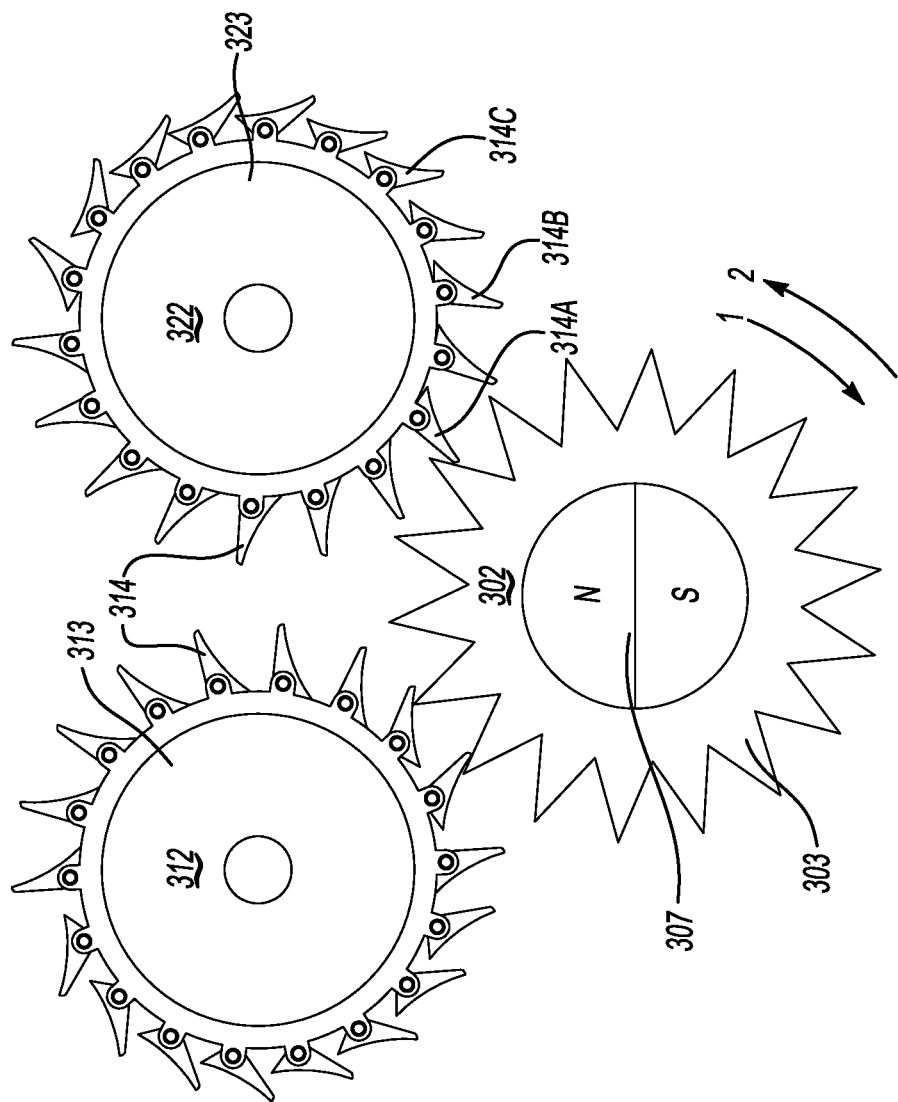
FIG. 5 is a close-up elevation view of portions of the embodiment of FIG. 3, where the curved arrows 1 and 2 represent directions of rotation of the Master Gear 302.

The main shaft of the wave interface 106 transfers alternating, rotational motion to the Part 2 Unit Shaft 306 magnetically, as discussed in FIG. 2 (or physically if the user chooses not to use magnetic transfer of rotational motion), which is then transferred to the master gear 302. Referring to FIG. 5, the Master Gear 302 rotates in an alternating manner (clockwise then counter-clockwise). However, the Receiving Gears 312 and 322 only accept one direction of motion due to their collapsible teeth (See FIG. 5). This allows for selective transferring of alternating motion. The Receiving Gears 312 and 322 and the output gears 318 and 328 transmit an upward, non-alternating motion to the Output Rods 319 and 329, respectively. The potential uses of this motion are discussed in Part 3. In one embodiment, the Master gear 302, Receiving gears 312 and 322 have a face surface 303, 313, 323 respectively, each in a parallel and substantially vertical plane so that the teeth 314 are able to become erect by their own weight.

Substantially vertical plane shall herein be defined to be something other than perfectly and mathematically exactly vertical and capable of permitting the teeth 314 to become erect by their own weight as described herein. If the faces 313, 323 and 303 are declined from a vertical orientation by less than 45 degrees it shall be herein referred to as—more vertical than horizontal—if the declination is less than 22.5 degrees then it shall be referred to as—nearly vertical—and if the declination is less than 11.25 degrees it shall be considered—almost vertical—and if the declination is less than 5 degrees it shall be considered—substantially vertical.

Figure 6:
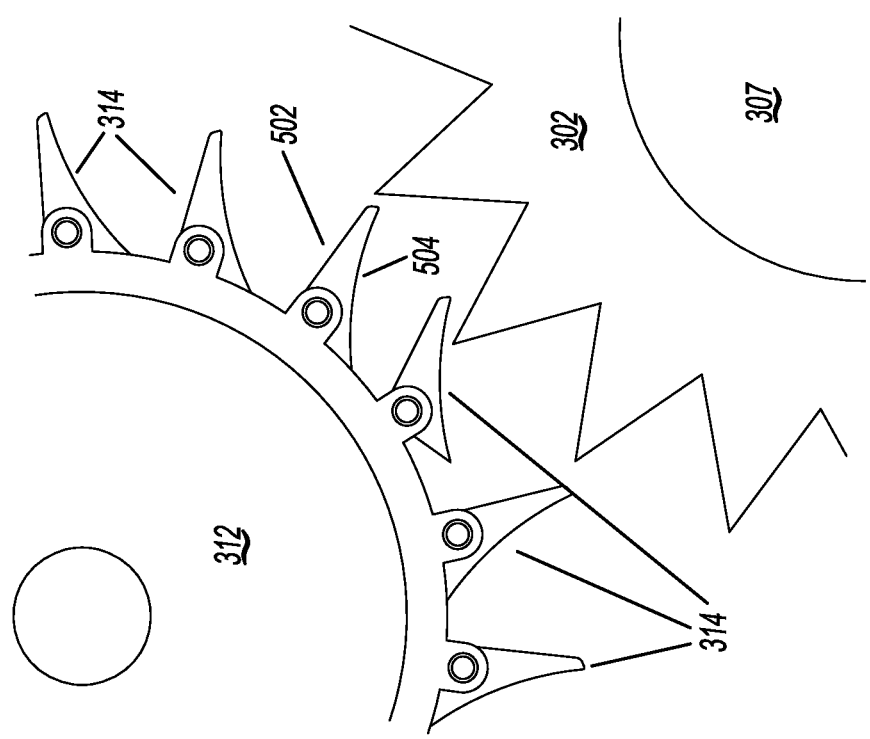
FIG. 6 is another close-up elevation view of the embodiment of FIGS. 3 and 4.

The alternating motion is represented by two states: 1 and 2. The example shown in the FIG. 5 depicts state 1 and 2 (clockwise and counterclockwise). The descriptions of states and their outcome is given below:

State 1: Clockwise movement of the Master Gear 302. During this rotation, the unidirectional collapsible teeth 314 of the Left Receiving Gear 312 collapse when encountering the Master Gear 302 (FIG. 5) (contact-induced collapse), whereas the unidirectional collapsible teeth 314 of the Right Receiving Gear 322 remain erect. This allows the Master Gear 302's clockwise movement 1 to be transmitted to the Right Receiving Gear 322 via erect unidirectional collapsible teeth 314A wherein it will become a counter-clockwise movement for gear 322. The Master Gear 302 clockwise rotation 1 is the "selected movement" for the Right Receiving Gear 322, and is the "unselected" movement for the Left Receiving Gear 312. FIG. 6 shows a close-up view of example dynamic states of the left receiving gear collapsible teeth 314, during the rotation occurring in state 1; in particular, contact-induced collapse is shown.

State 2 (dynamic states of collapsible teeth for this movement are not depicted): Counter-clockwise movement 2 of the Master Gear 302. During this rotation, the unidirectional collapsible teeth 314 of the Right Receiving Gear 322 undergo contact-induced collapse, whereas the teeth 314 of the Left Receiving Gear 312 remain erect. This allows the counter-clockwise motion 2 of Master Gear 302 movement to be transmitted to the Left Receiving Gear 312 via erect unidirectional collapsible teeth, wherein it will become a clockwise movement for gear 312. The Master Gear 302 counter-clockwise rotation 2 is the "selected movement" for the Left Receiving Gear 312, and is the "unselected" movement for the Right Receiving Gear 312. Tooth 314C is shown in a fully collapsed state, tooth 314B is in a partially collapsed state, and tooth 314A is shown in a fully erect state. In the context of the present invention, by definition, a tooth on a Receiving Gear, as shown, that is in a fully collapsed state is not capable of being engaged by any tooth on the Master Gear. Similarly, a tooth that is fully erect is capable of being contacted by a tooth of a Master Gear and, depending upon the direction of rotation, will either tend to collapse the tooth or drive rotation of the Receiving Gear. For example, if the main gear 302 is rotated clockwise, it will contact the fully erect tooth 314A and drive the rotation of Receiving Gear 322. However, if the direction of rotation of the main gear 302 is switched and turns counter-clockwise, an adjacent tooth on the main gear will contact tooth 314A and tend to cause it to collapse (contact-induced collapse).

In the embodiments where the Receiving Gears 312 and 322 comprise weight-based unidirectional collapsible teeth, a constraint limiting the relative position of the master gear is caused. In these embodiments, wherein the receiving gear teeth must self-erect under their own weight before interacting with the master, the master member (whether it be a gear or rack free of collapsible teeth) shall be centered on an axis that is below the receiving gears to allow said collapsible tooth self-erection to occur.

Left Receiving Gear 312 only rotates in a clockwise direction, while the Right Receiving Gear 322 only rotates in a counter-clockwise direction.

Result: The bi-directional motion of the main shaft 106 of the wave interface is selectively separated into the Receiving Gears 312 and 322 by Part 2. Once separated, it is easier to use the motion for the production of energy (potential uses mentioned in Part 3).

Figure 4:
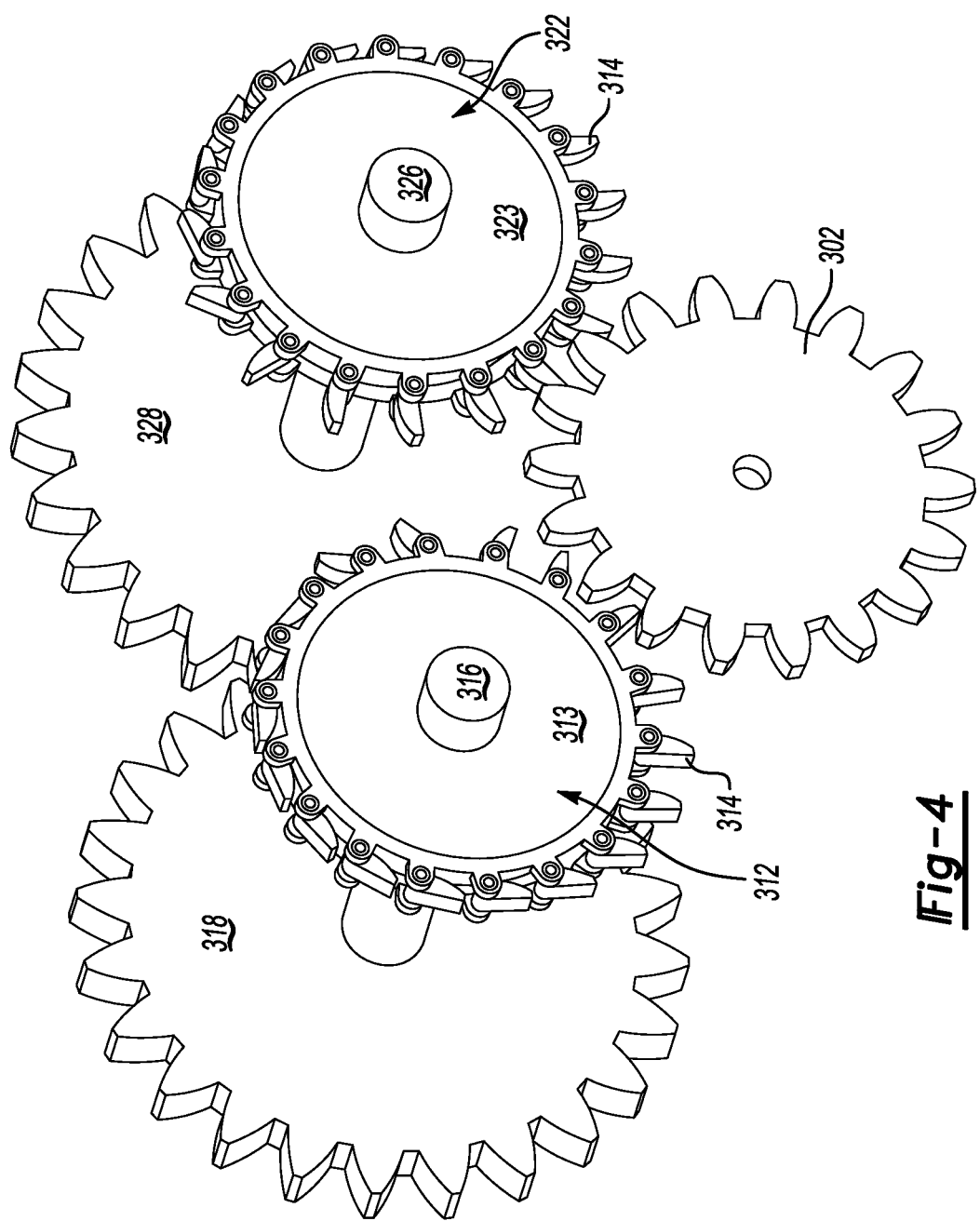
FIG. 4 is a perspective view of one embodiment of the Alternating to Direct Motion Converter (ADMC) portion of the present invention, where two output gears mesh to unify the selective motion of the receiving gears.

Referring to FIG. 4, another embodiment is shown where the separated motions in gears 312 and 322 are unified by meshing gears 318 and 328. For such an embodiment, only one output rod (or other output body) is needed to be meshed with one of the output gears (318 or 328). Both directions of the bidirectional motion will be converted to unidirectional and transmitted to said output rod due to said unification.

Referring to FIG. 5, the gear teeth 314 of each Receiving Gear 312 and 322, become erect shortly before encountering the Master Gear 302 due to the force of the earth's gravity. The gear teeth 314 are designed to only collapse in one direction, i.e. they are unidirectional. Referring to FIG. 6, this is because one side of each tooth has a cliff 502, so as to not encounter normal force from the Receiving Gear body 312 when the tooth is pushed toward said cliff, and the other side has an oblique 504, so as to allow normal force to prevent a collapse when the tooth is pushed toward said oblique. This means that when a receiving gear tooth 314 is pushed toward the cliff 502, it collapses, but when it is pushed toward the oblique 504, it remains erect due to the normal force provided by the Receiving Gear's body 312.

Figure 20:
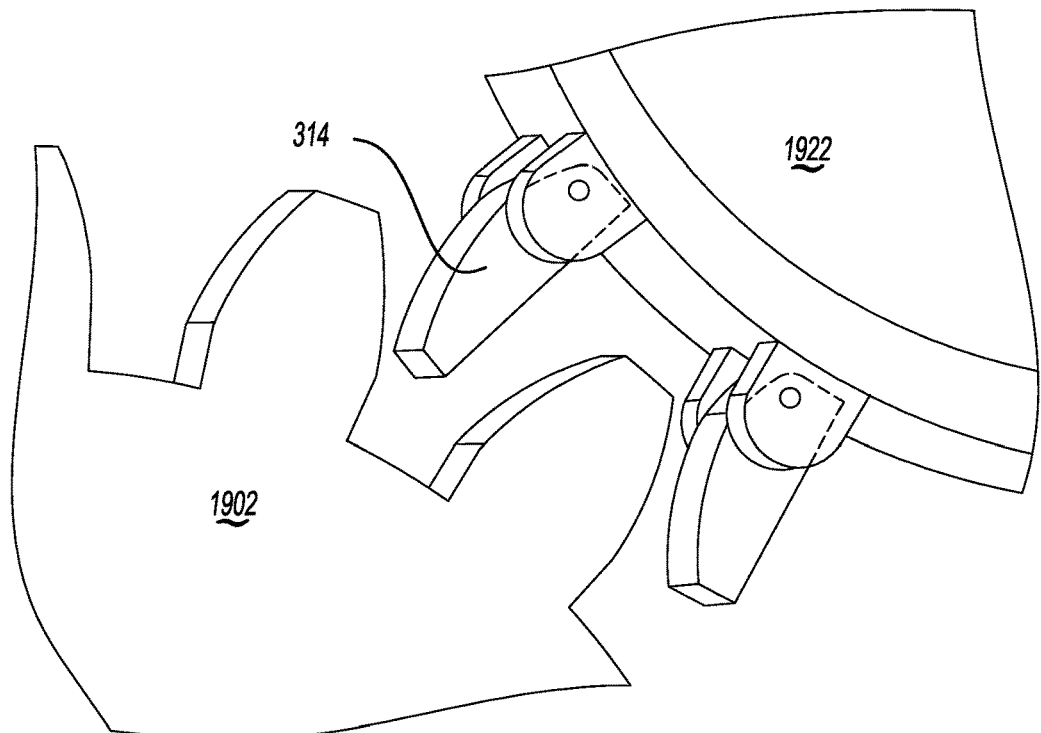
FIG. 20 is a close-up perspective rendering of an alternate embodiment of an ADMC with involute teeth.

The obliques and cliffs are mere examples of the existence of physical mobility limitations and the lack of said existence respectively for a unidirectional collapsible tooth: a physical mobility limiter on a first side of the tooth will prevent a collapse when the tooth is pushed toward said first side, and a lack of said mobility limiter on the second opposite side will allow collapse of the tooth when pushed toward said second side. For instance, referring to FIG. 4, the collapsible unidirectional teeth 314 have a half involute profile and do not conform to an oblique and cliff representation of the embodiment in FIG. 5, however, their shape comprises a physical mobility limiter on one side of the pivot of the revolute joint and a lack of a mobility limiter on the other side (FIG. 20 shows a close-up view).

The collapse of unidirectional collapsible tooth 314 portrayed in FIG. 6, due to contact force from the meshed Master Gear tooth, is a desirable condition allowing selective rotation and will be referred to herein as "contact-induced collapse".

Now referring to FIGS. 3 and 4, the Left Receiving Gear 312 and Right Receiving Gear 322 teeth 314 configurations are laterally inverted between the two receiving gears to allow the separate capture/transferring of the two motions of the main gear 302. It is imperative to keep these systems well lubricated for smooth and uninterrupted movement. It is recommended to use ball bearings in all revolving joints (for every tooth). The weight of each collapsible tooth needs to be minimized in order to ensure easy collapse and reduce energy loss in each collapse. It is recommended to use a strong, but lightweight material.

In the embodiment shown in FIG. 3, given the fact that the Left Receiving Gear 312 only rotates in a clockwise direction, while the Right Receiving Gear 322 only rotates in a counterclockwise direction, the motion is transmitted to their respective output gears, which then transmits a single, direct (or unidirectional) motion to the output rods in succession.

Figure 7:
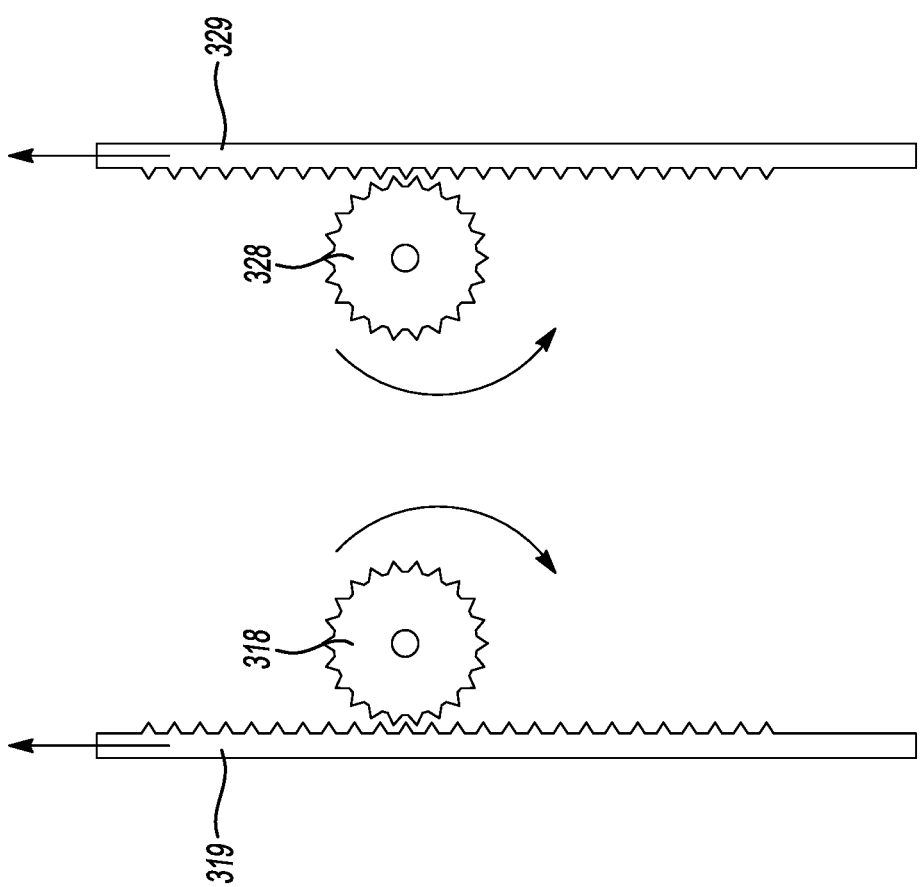
FIG. 7 is a close-up view of a portion of the embodiment of FIG. 3, where the thick curved arrows show the direction of rotation of the gears 318 and 328 during normal operation and the vertical arrows represent the direction of translation of the upright members 319 and 329.

Now referring to FIG. 7, the left output gear 318 rotates only in a clockwise direction and the right output gear 328 rotates only in a counter-clockwise direction. This motion drives the output rods 319 and 329 (or racks) upward, and never downward. The output rods will take turns to move upwards (not simultaneously). It will be the user's responsibility to design a mechanism to keep the rod from falling as they are lifted cyclically, and then to ensure that the rod returns to a usable position (perhaps using gravity) once its entire length is lifted.

Referring to FIG. 4, an alternate design exists to this two output rod system. In this embodiment, the output gears 318 and 328 are meshing with each other and the output rod 329 is eliminated. All movement appears on output rod 319. In all embodiments of the ADMC, the output rod may be replaced with a gear that is coupled to an electric generator and/or a power storage device.

In order to avoid water friction (drag) forces faced by the alternating-to-direct motion converter (Part 2 unit), this system needs to be housed in a waterproof chamber. Increased efficiency can be attained if a vacuum chamber is used since air friction will be avoided. If this capability is not available, this converter may be placed above ground and a driving belt may be used to transmit the rotation of the shaft to the converter.

Potential for Missed Teeth During High Acceleration Events

During testing, in a very high acceleration scenario, high speed video footage showed that at the initial moments of the Master Gear's spin, the Left Receiving Gear 312 starts to encounter a high acceleration in the counterclockwise direction. This high acceleration causes inertia-driven collapse of the receiving Gear teeth 314 where teeth-collapse was not desirable. The master 302 then continues to spin fast relative to the receiving gear, missing some of the receiving gear 312's collapsed teeth 314s. Once the Receiving Gear 312's initial acceleration ends, the teeth 314 quickly become erect as centrifugal forces take over, the master 302 is then able to keep the Receiving Gear 312 spinning at the master's teeth displacement rate until the cycle is complete and the direction switches. However, during this process, some energy is lost.

Figure 8:
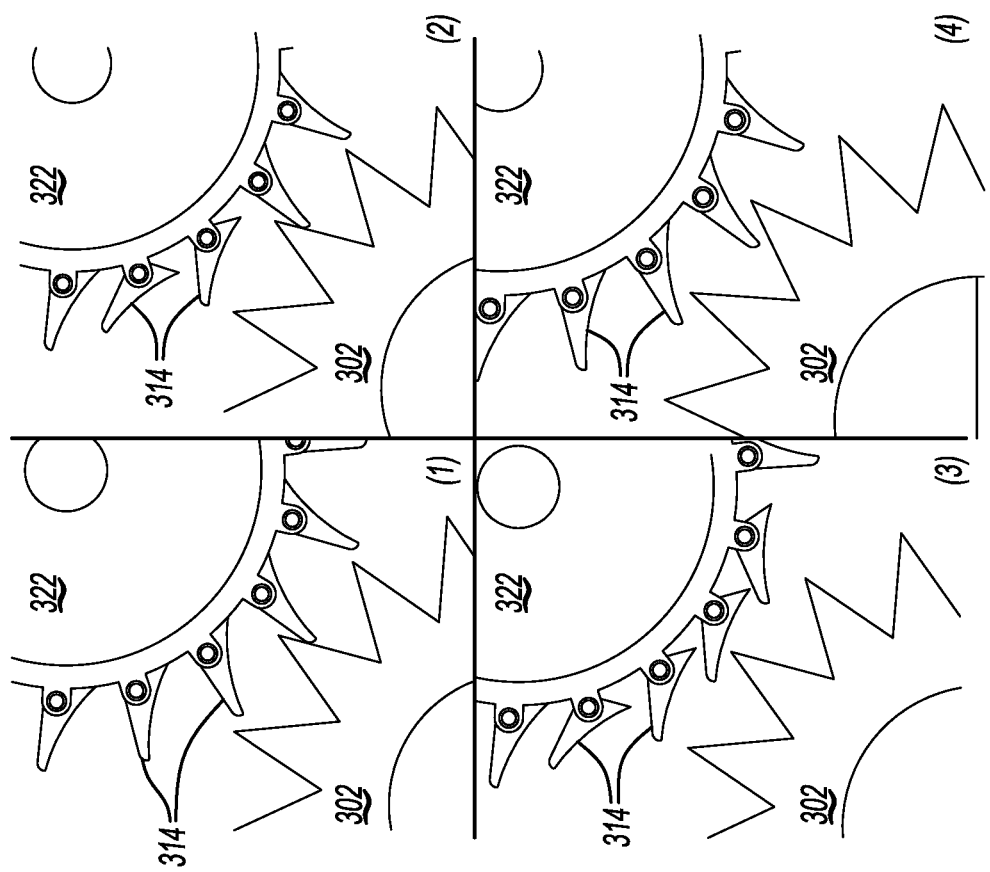
FIG. 8 is a collection of a sequence of views of a portion of the embodiment of FIG. 3, which demonstrates inertia driven teeth collapse observed during a very high acceleration test scenario of a Receiving Gear 322, where the numbers (1), (2), (3) and (4) in the lower right hand corner of each section represents the temporal order of the sequence.

The stages of inertia-driven teeth collapse are described below, with reference to FIG. 8.

The instant when the Master Gear 302 begins its high acceleration (angular and circumferential). This acceleration is successfully transmitted to the Receiving Gear teeth 314 on the first instant (section 1).

As the Receiving Gear 322 accelerates with high acceleration, if the circumferential acceleration of the Receiving Gear 322 exceeds the teeth's 314 natural falling acceleration, the Receiving Gear teeth 314 collapse due to inertia (undesired) (section 2).

The master 302 then misses the collapsed gear teeth 314. As soon as contact is lost, no torsional force is transmitted from the master 302 to the receiving gear 322. This means that the output load will take over as the dominant force.

The instant the master 302 loses contact with the receiving gear 322, the output load takes over, and causes the deceleration of the Receiving Gear (section 3).

Once the acceleration slows down to below the natural falling acceleration of the gear teeth 314, or acceleration stops or deceleration begins, the centrifugal forces of the spin takes over and causes the teeth 314 to become erect again, allowing the master 302 to resume contact with the receiving gear and continue spinning the receiving Gear (section 4).

The fourth point conveys that even with inertia-induced collapse of the Receiving Gear teeth 314, the system will continue to function to linearize oceanic waves into a single direction, despite some loss of potential motion extraction due to missed receiving gear teeth 314 (point 3). There is also a minor possibility that the collapsing (3)/recovering (4) teeth may interact with a Master Gear tooth in such a manner as to cause a gear jam. The likelihood of this occurrence depends upon the shape of the receiving gear and master teeth that the user designs. The likelihood of this occurrence is extremely low for master induced collapse cases.

Therefore, if the user wants to maximize wave motion extraction and minimize the likelihood of a gear jam, inertia-induced collapse of the receiving gear teeth must be prevented.

Solutions to Inertial-Driven Collapse of Receiving Gear Teeth

Four optional solutions are presented to prevent inertia-driven collapse of the Receiving Gear teeth.

Solution 1: Increase Output Load to Reduce Acceleration of Gear Teeth

See Part 3 for methods of using the output of this system. The user may choose to increase the output load of the system during higher tides. This will reduce the resulting torsional force on the Receiving Gear, thus reducing the max acceleration that the receiving gear teeth face, and reduce the likelihood of inertia induced teeth collapse.

The user would have to design an efficient method to vary the output load based on the expected acceleration of the buoy. A procedure to calculate the Receiving Gear teeth acceleration and compare that to the Receiving Gear teeth's natural falling acceleration is given below.

First measure the natural falling acceleration of Receiving Gear teeth 314 shown in FIG. 6, and save it as Afall, a constant. This value will depend on friction, tooth design, etc.

This is the tooth that is about to encounter the master. If the acceleration to this tooth caused by the master's push exceeds Afall, it will collapse due to inertia. The master teeth acceleration is dependent on the buoy's acceleration.

The acceleration of the buoy will be transmitted to the main shaft with the angular acceleration defined below:

$$\alpha = \frac{A_{buoy}}{R_{shaft}} \text{ in radians per second square.} \quad \text{(Equation 1)}$$

Where Abuoy is the Acceleration of the buoy, which a user can measure using an accelerometer.

Rshaft is the radius of the main shaft where the rope meets the shaft (narrowed).

α is the main shaft's angular acceleration.

This angular acceleration is transmitted unto the Master Gear, whose teeth will have the circumferential acceleration as given below in equation 2. This master teeth acceleration will equal the receiving gear teeth acceleration during contact.

$$A_{teeth} = \alpha \cdot R_{master} \quad \text{(Equation 2)}$$

Merging Equations (1) and (2), equation (3) is obtained:

$$A_{teeth} = \frac{A_{buoy}}{R_{shaft}} \cdot R_{master} \quad \text{(Equation 3)}$$

Where Ateeth is the acceleration faced by the Receiving Gear teeth caused by the Master.

Rmaster is the radius of the Master Gear.

This solution recommends that the user use equation (3) while measuring the acceleration of the buoy using an accelerometer, and increase the output load until the Acceleration of the teeth reduces below the natural falling acceleration of the Receiving Gear teeth (a constant).

$$A_{teeth} = \frac{A_{buoy}}{R_{shaft}} \cdot R_{master} < A_{fall} \quad \text{(Equation 4)}$$

Rearranging the above:

$$A_{buoy} < A_{fall} \frac{R_{shaft}}{R_{master}} \quad \text{(Equation 5)}$$

To conclude: during high tides, the user shall increase load until equation 5 is satisfied. As long as equation 5 is satisfied, inertia-induced collapse will not occur.

Limitations

The higher load, and thus reduced Receiving Gear acceleration, resists the acceleration and movement of the Master Gear, which, in turn, resists the acceleration and movement of the buoy. This may lead to buoy submersion.

User needs to have an efficient method to adjust output load, higher supervision may be needed for the overall system.

Solution 2: Centrifugal Collapse Blockers on Receiving Gears

Figure 9:
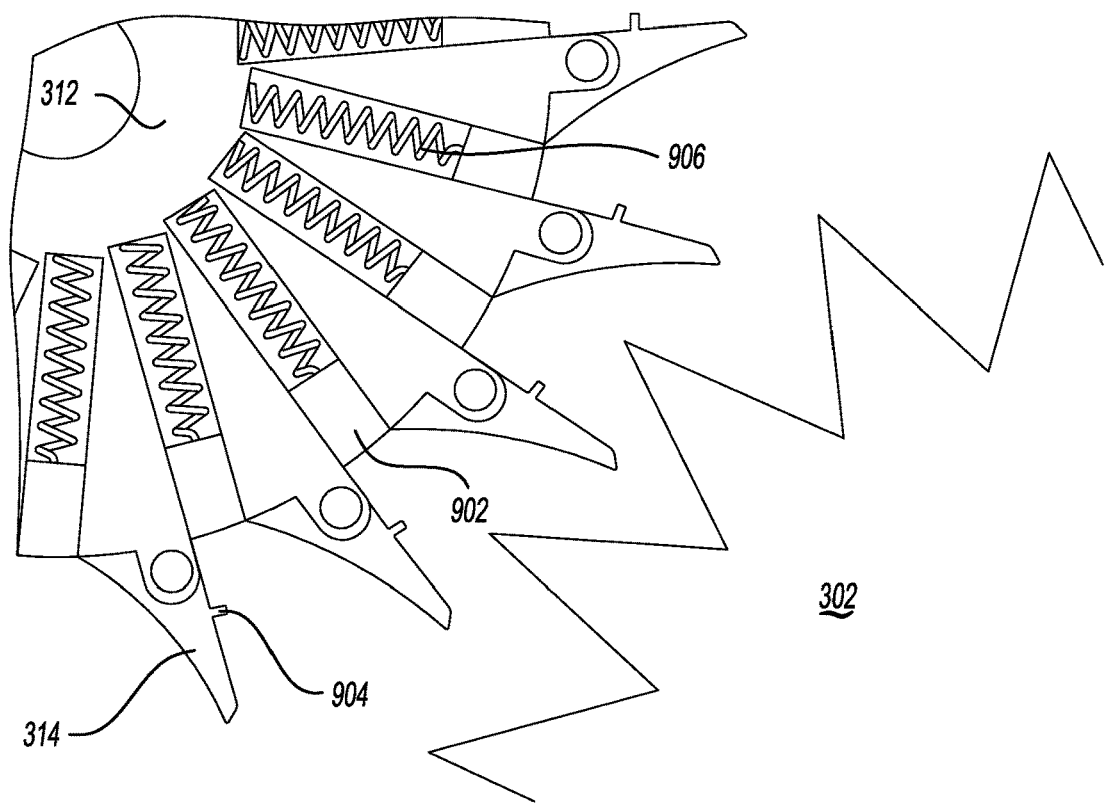
FIG. 9 is a close-up view of a portion of an alternate embodiment of the invention which includes an alternate Receiving Gear 312.
Figure 10:
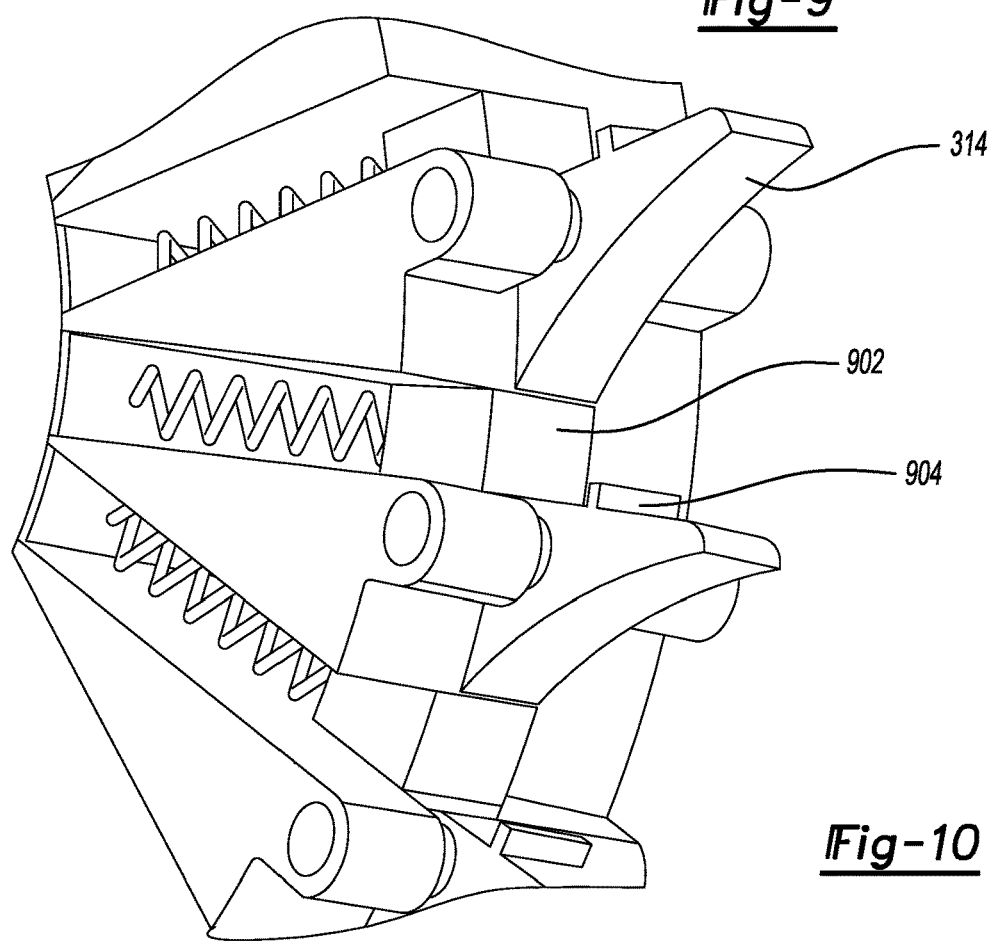
FIG. 10 is a close-up perspective view of a portion of the alternate Receiving Gear 312 of FIG. 9.
Figure 11:
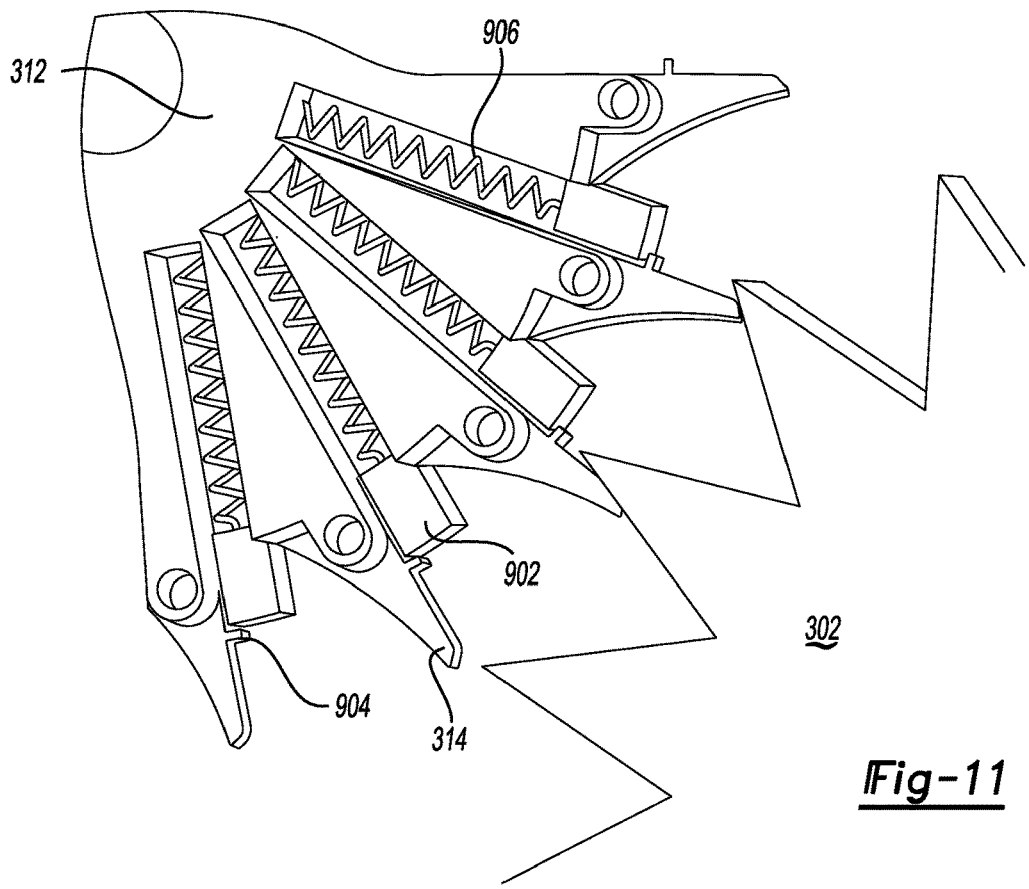
FIG. 11 is a view of the alternate embodiment of FIGS. 9 and 10 where the array of radial lines extending from the alternate Receiving Gear 312 represent the centrifugal force on the blockers during an instant of high acceleration, where the curved arrows represent rotation direction of the gears.

Now referring to FIGS. 9, and 10, and 11, if the user does not have an efficient system of adjusting output load, this solution can be used to prevent Receiving Gear collapse. This solution uses centrifugal force to extend an obstruction ("a blocker 902") when the Receiving Gear 312 starts to spin. The blocker 902 is retracted by the spring 906 when the spinning stops. Note, the springs should be able to support the full weight of the centrifugal collapse blockers, without extending, so that the blocker only deploy when centrifugal acceleration occurs.

Centrifugal collapse blockers block the teeth of a Receiving Gear from inertia-induced collapse when the Receiving Gear is spinning A spring 906 retracts the blocker 902 back inside the gear 312 when no spin occurs. Then, when the master 302 spins in the unselected direction of a Receiving Gear 312 (intended to spin the other receiving gear), the particular Receiving Gear itself will not be in motion, and the centrifugal collapse blockers will not be deployed due to the lack of any centrifugal forces, thus allowing teeth collapse.

The block limiter 904 on FIGS. 9, 10 and 11 ensures the blocker 902 does not become dislodged in the case of very high speed spins.

The centrifugal collapse blockers 902 will only deploy in a Receiving Gear 312 when the master is spinning in the selected direction of that Receiving Gear.

The advantage of this solution is that all motions of the Master Gear, regardless of acceleration, will be captured.

Solution 3: Switching of Master Gear Based on Tide

The user may change the Master Gear with a smaller master if the tide is high, this allows for a high angular acceleration of the master to be translated to a lower circumferential acceleration that the teeth face. Repeating equation 5 below:

$$A_{buoy} < A_{fall} \frac{R_{shaft}}{R_{master}} \quad \text{(5)}$$

Switching gears to a smaller master will increase the value of the right hand side of the equation, thus more easily satisfying the above necessity to prevent inertia induced collapse.

Reducing the Master Gear size however will reduce the amount of motion transmitted to the Receiving Gear.

Solution 4: Dynamic Change of Master Gear's Effective Size

Figure 12:
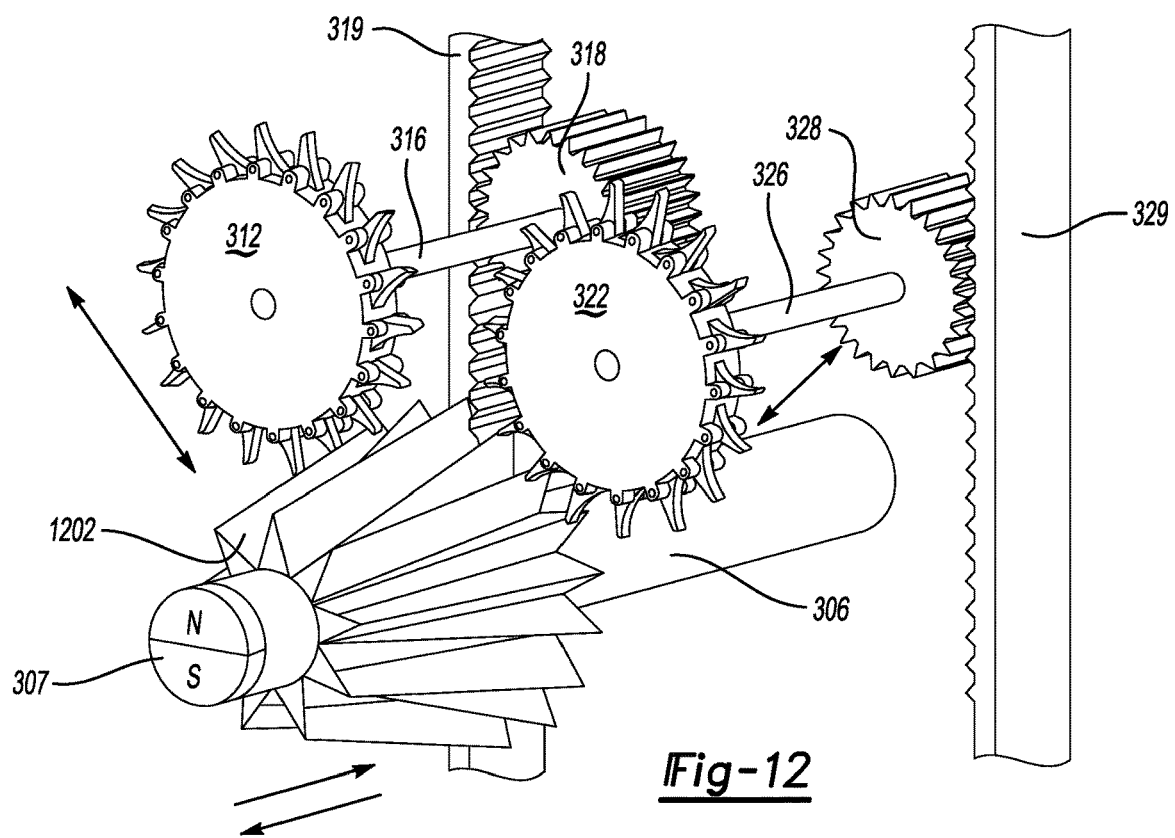
FIG. 12 is an alternate embodiment of the present invention where the double headed arrows represent translational motion of the Receiving Gears 312 and 322 and the parallel opposing single headed arrows represent the direction of translational motion of the Master Gear cone 1202.

Now referring to FIG. 12, there is shown a Master Gear cone 1202 to dynamically adjust effective master size. This can also be done using a Continuously Variable Transmission (CVT).

The user shall adjust Master Gear cone to satisfy equation (5).

$$A_{buoy} < A_{fall} \frac{R_{shaft}}{R_{master}} \quad \text{(5)}$$

Alternate Designs without Inertial-Driven Collapse of Receiving Gear Teeth

1. Radially Outwardly Spring Biased Retractable Teeth

Figure 19:
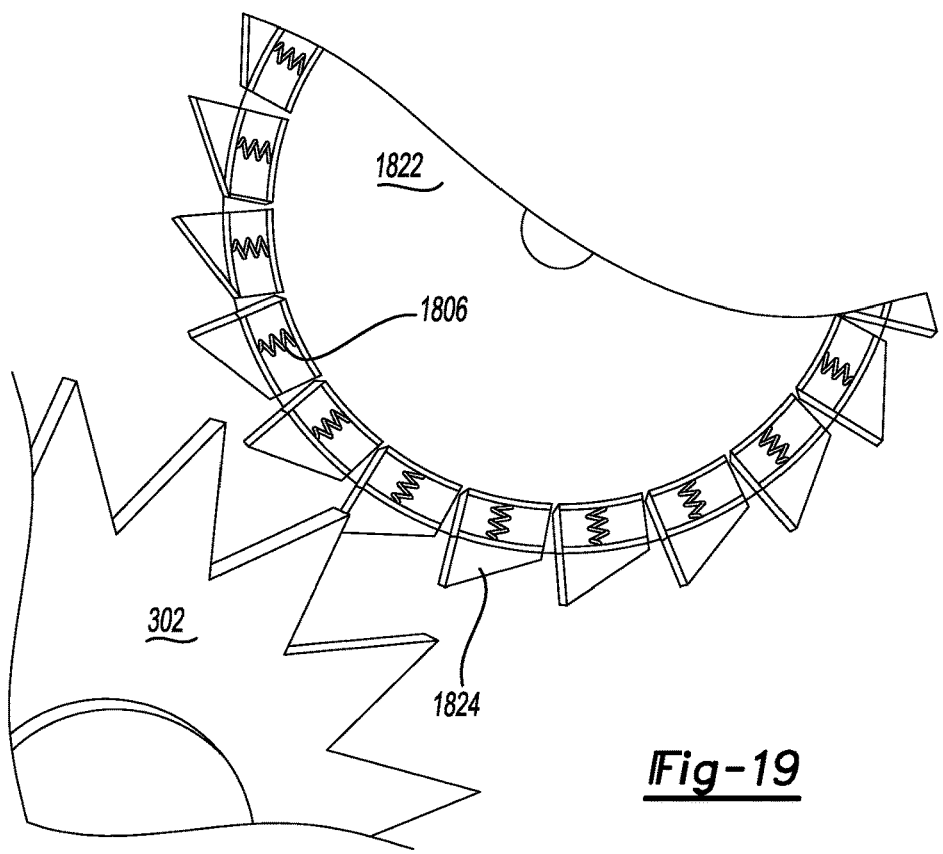
FIG. 19 is an alternate embodiment of the retractable teeth of an alternate ADMC of the present invention.

Now referring to FIG. 19, in this embodiment, spring 1806 powered retractable gear teeth 1824, which retract when the Master Gear 302 spins in one direction while remain deployed when the master spins in the Receiving Gear's selected direction, are used instead of collapsible unidirectional gear teeth. The motion transfer mechanism of the Master's bi-directional motion remains the same with this Receiving Gear variant.

Alternate ADMC Configurations

1. Single Master Shaft Double Master Gear ADMC

Figure 21:
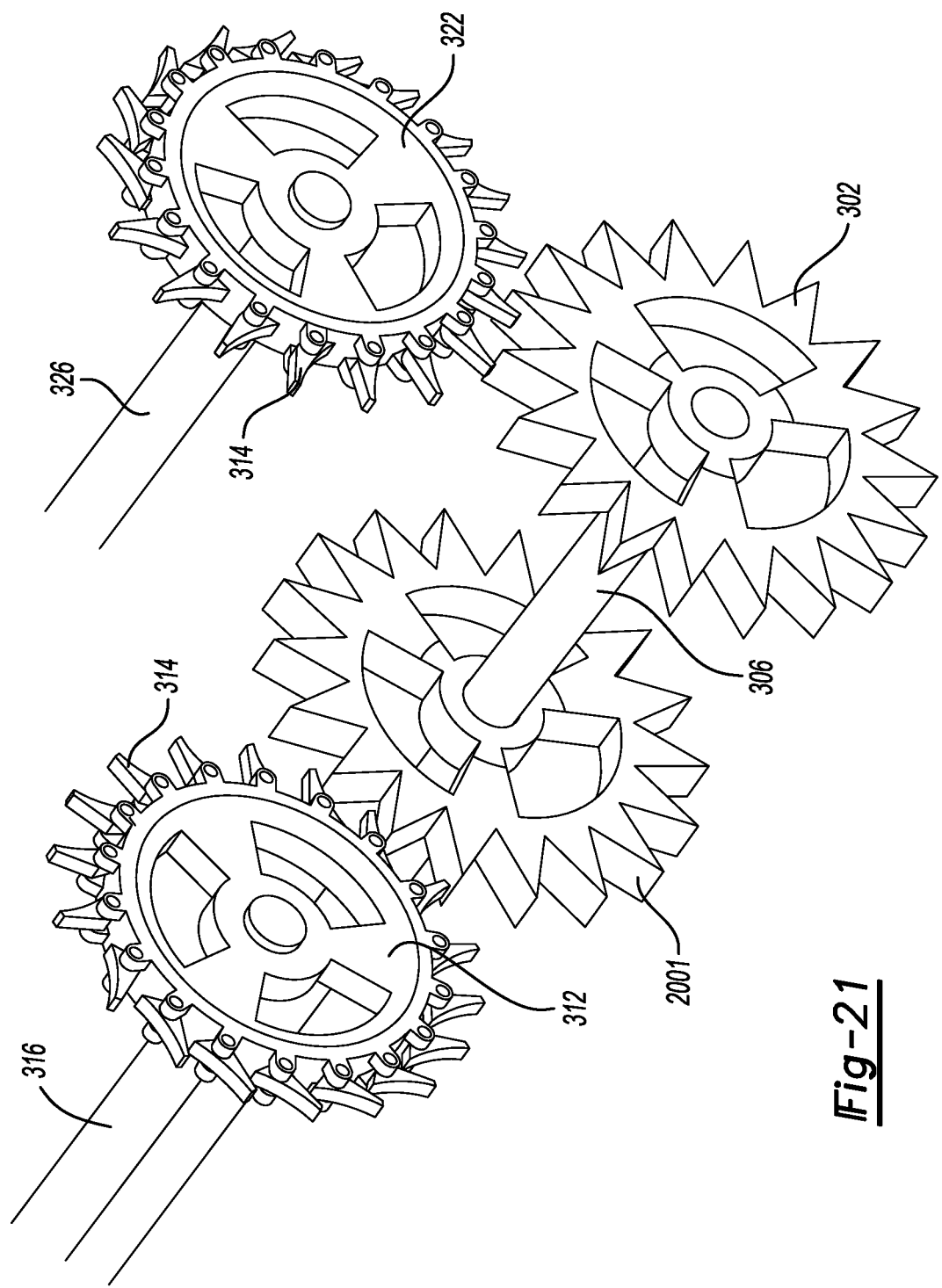
FIG. 21 is a simplified perspective view of an alternate embodiment of an ADMC.

Now referring to FIG. 21, there is shown an alternate ADMC configuration, which is the same as FIG. 3 except that the main shaft 306 has a front master gear 302 and a rear master gear 2001. The Receiving Gear 312 meshes with the rear master gear 2001 while the Receiving Gear 322 meshes with the master gear 302.

Figure 22:
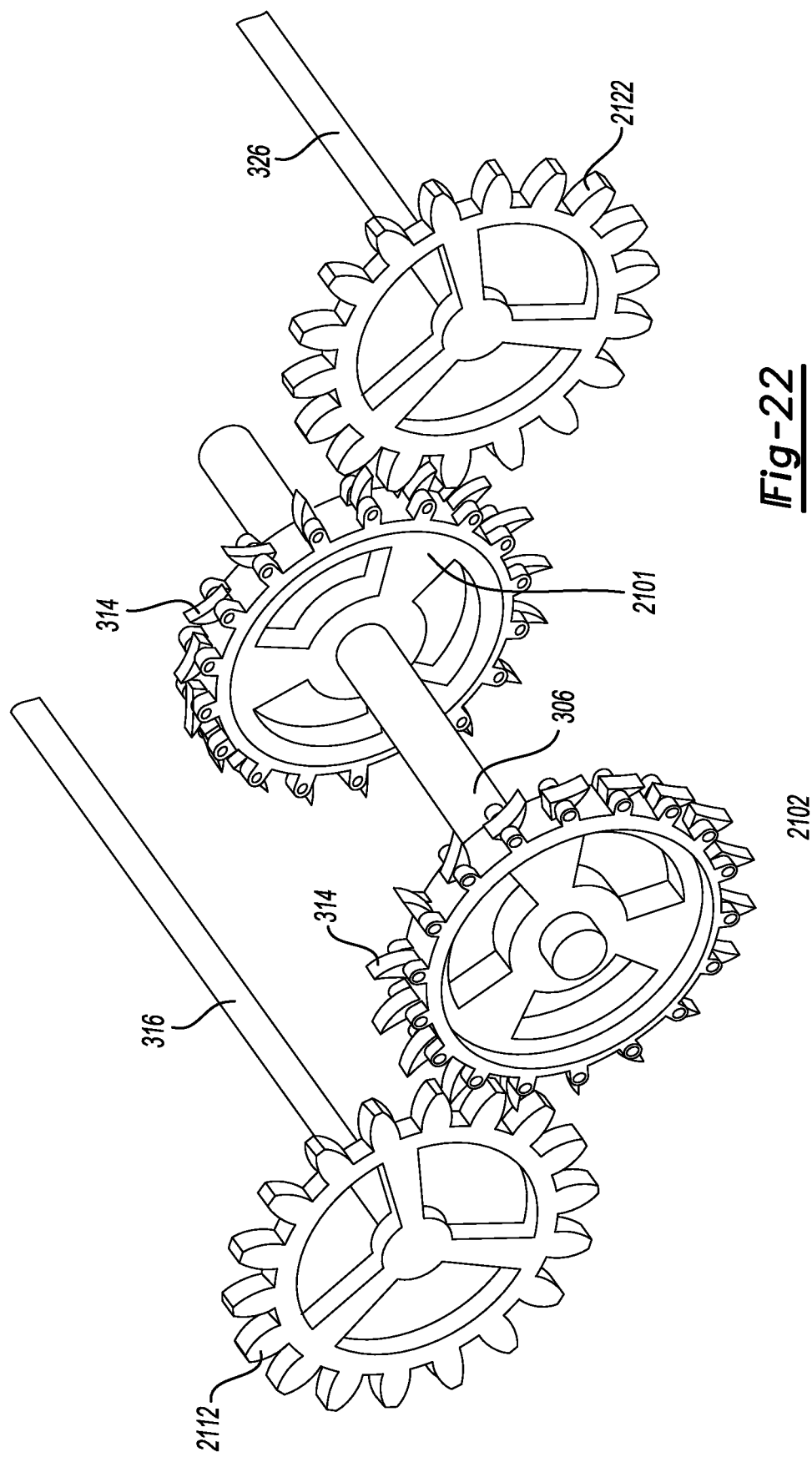
FIG. 22 is a simplified perspective view of an alternate embodiment of the ADMC.
Figure 23:
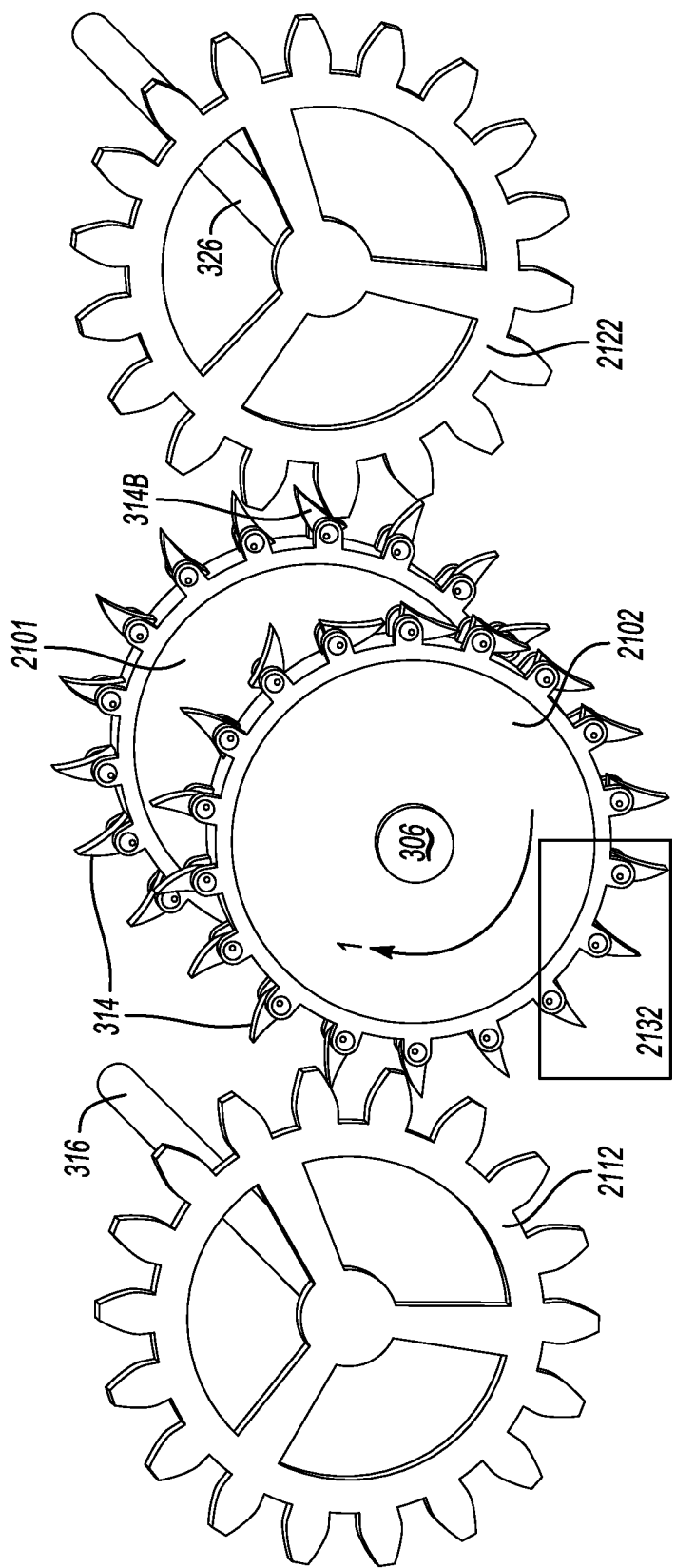
FIG. 23 is a simplified perspective view of an alternate embodiment of the ADMC.

2. Single Main Shaft Double Laterally Inverted Master Gears with Unidirectional Collapsible Gear Teeth Now referring to FIG. 22, there is shown an alternate ADMC which is the same as that shown in FIG. 21, except that the unidirectional collapsible gear teeth are on the master shaft 306 gears 2102 and 2101 and not on the receiving gears 2112 and 2122, which are hereby defined herein to be examples of "conventional gears" because they are bi-directional and are free of any collapsible teeth. The master shaft is allowed to rotate with bidirectional motion, and the collapsible teeth of the front master gear are arranged to be laterally inverted with respect to the rear master gear. FIG. 23 is a close-up view of the embodiment in FIG. 22, but without cutouts in the master gear (done to remove excess mass), in order to reduce visual complexity. FIG. 23 shows an example spin in just the clockwise direction of the master shaft (clockwise and counterclockwise are possible). In order to be effective, weight based unidirectional collapsible teeth and associated meshing gears are arranged such that:
  a. an adjacent meshing gear's force against said tooth's weight, causes the tooth to collapse;
  b. an adjacent meshing gear's force toward said tooth's weight, causes the tooth to remain erect; and
  c. the tooth is allowed to re-erect before the adjacent gear interacts with the tooth.

Thus referring to FIG. 23, the master shaft is shown moving in an example clockwise direction 1. The unidirectional collapsible teeth 314 on the front master gear 2102 become erect when entering the region 2132 before interacting with the adjacent meshed receiving gear 2112. During interaction between the collapsible teeth of the front master and the gear 2112, the collapsible teeth 314 exert a force against the teeth of the receiving gear 2112, and the teeth of the receiving gear exert an equal and opposite force toward the direction of the weight of the collapsible gear in the region of interaction, thus causing it to remain erect, and allowing the transferal of motion from the master shaft 306 to the receiving shaft 316 through said teeth interaction.

However, on the rear master gear 2101, the unidirectional collapsible teeth 314 are attached in a laterally inverted manner to that of the front master gear 2102. Therefore, during the same clockwise motion of the master shaft 306, the interaction with the receiving gear 2122 causes an upward force on said unidirectional teeth, against the collapsible tooth's weight, thus causing a collapse of the tooth (interaction of tooth 314B).

Figure 24:
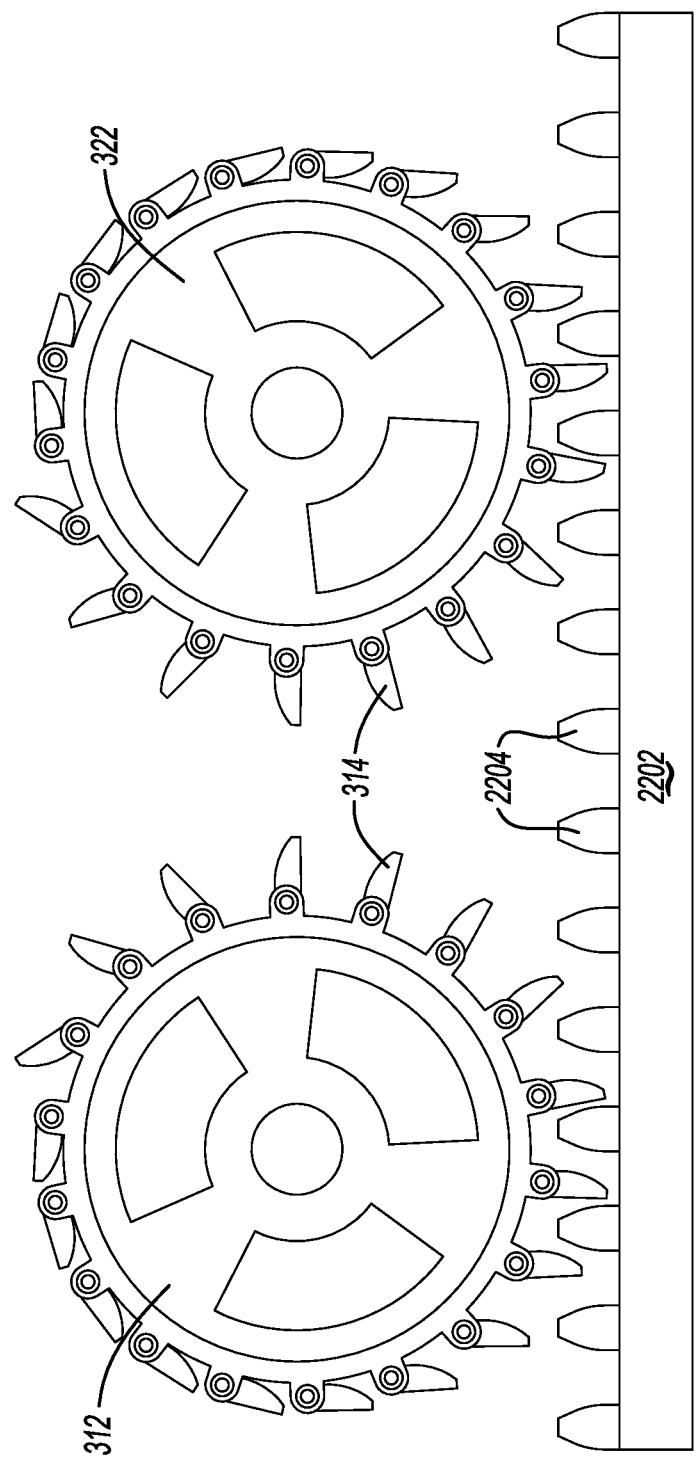
FIG. 24 is a simplified front view of an alternate embodiment of an ADMC with an input rack as the master input member.

3. Master Rack and Two Receiving Gears with Unidirectional Collapsible Gear Teeth With an ADMC embodiment comprising weight based unidirectional collapsible teeth on two receiving gears, master input members can have several variations as long as they interface with said collapsible teeth after their gravitational self erection. Thus referring to FIG. 24, an example embodiment of the master member being a toothed rack 2202, free of collapsible teeth, is shown. The line of the master-receiving gear teeth interface occurs on an axis that is below the axis of the receiving gears so as to allow for gravitational re-erection to occur. The embodiment may also comprise output gears, rods (not shown in the figure since only the separation of motion is relevant in this section's discussion).

Selective Motion Transfer Constraints for Weight Based Unidirectional Collapsible Gear Teeth On a more granular level, looking at the interaction between just two gears (in a possible larger system), one gear with gravitational self-erecting collapsible unidirectional teeth, and the other gear free of collapsible teeth, there are positioning constraints that must be followed in order to achieve effective selective motion transfer.

More Detailed Description of Part 3: Energy Storage

The energy extracted from waves using this invention can be stored in several forms and can interface with several existing technologies. The energy storage section discussion is only meant to provide context to Part 1 and Part 2, the energy storage suggestions below are not meant to be claimed for this invention.

Energy Storage Suggestions

The unidirectional output of this invention can be used to store energy by:
  a. Lifting heavy objects up, thus storing the kinetic energy output as gravitational potential energy; the heavy object is connected to a spinnable turbine and electricity generator system. The heavy object can be dropped as needed, in order to generate consistent energy.
  b. Powering flywheels that store kinetic energy and later generate electricity as needed, pumping water to a high-altitude reservoir using a centrifugal pump, which can be released as needed to produce energy or directly driving an electrical generator connected to a battery for storage.

CONCLUSION

The invention described herein (Introduction, Part 1 and Part 2) allows for the extraction of the crest, trough, forward and retreat motions of oceanic waves into a single, unidirectional (or direct) motion for usage in the generation of electricity. This energy source is both renewable and non-emitting.

The precise implementation of the present invention will vary depending upon the particular application, for example ball bearing revolute joints that prevent lateral motion are shown as arbitrary in all drawings.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:
1. A method of converting directionally alternating motion to unidirectional motion comprising the steps of:
  providing a master input member configured to move in alternating directions;
  providing a first receiving shaft;
  providing a second receiving shaft;

providing a plurality of unidirectional collapsible gear teeth;
wherein said plurality of unidirectional collapsible gear teeth form an interface between the master input member; and
the first receiving shaft; and
the second receiving shaft;
wherein each of said plurality of unidirectional collapsible gear teeth collapse when pushed in a first direction relative to a tooth;
remain erect when pushed in a second direction relative to the tooth;
are disposed on at least one of a first gear and a second gear; and
wherein the master input member, the first receiving shaft, the second receiving shaft, the first gear, the second gear, and the plurality of unidirectional collapsible gear teeth, in combination, are configured such that
a movement of the master input member in a first direction causes contact-induced collapse of unidirectional collapsible teeth between the master input member and the second receiving shaft, while transferring motion, via erect unidirectional collapsible teeth, to the first receiving shaft; and
a movement of the master input member in a second direction causes contact-induced collapse of unidirectional collapsible teeth between the master input member and the first receiving shaft, while transferring motion, via erect unidirectional collapsible teeth, to the second receiving shaft;
wherein each tooth of the plurality of unidirectional collapsible gear teeth is configured to be erected under its own weight by rotation with respect to a pivot attached to a gear body; and
transmitting a unidirectional motion to at least one of
an energy storage apparatus;
an electric generator for generation of electricity; and
a water pump for desalination.

2. The method of claim 1, wherein the first gear is a first receiving gear on the first receiving shaft and the second gear is a second receiving gear disposed on the second receiving shaft; and said plurality of unidirectional collapsible gear teeth are disposed on said first receiving gear and said second receiving gear.

3. The method of claim 2, wherein the master input member is a shaft allowed to rotate in alternating directions, further comprising the step of providing on the master input member, a first master gear with only non-collapsible teeth thereon.

4. The method of claim 2, wherein the master input member is a shaft allowed to rotate in alternating directions, further comprising the step of
providing on said master input member a first master gear and a second master gear;
wherein said first master gear is paired with said first receiving gear and said second master gear is paired with said second receiving gear; and
said first master gear and said second master gear are free of collapsible teeth thereon.

5. The method of claim 1, wherein the master input member is a shaft allowed to rotate in alternating directions, the first gear is a first master gear on the master input member, and the second gear is a second master gear on the master input member, further comprising the step of configuring each of the plurality of unidirectional collapsible gear teeth on said first master gear and second master gear:
wherein any of said plurality of unidirectional collapsible gear teeth on the first master gear are configured to be laterally inverted with respect to any of said plurality of unidirectional collapsible gear teeth on the second master gear; and
wherein a first receiving gear and a second receiving gear are free of any collapsible teeth thereon.

6. The method of claim 1, further comprising the steps of:
providing a first gear, free of unidirectional collapsible teeth, disposed on said first receiving shaft;
providing a second gear, free of unidirectional collapsible teeth, disposed on said second receiving shaft (in addition to at least one of the first gear and the second gear); and
wherein said first gear is rotationally coupled to the second gear.

7. The method of claim 2, wherein the master input member is an input rack free of said plurality of collapsible teeth thereon, allowed to move translationally in alternating directions.

8. The method of claim 1, wherein each tooth of the plurality of unidirectional collapsible gear teeth has an involute tooth profile on a side of the tooth that first contacts an adjacent gear which is rotating in a direction which does not cause a collapse of the tooth.

9. The method of claim 1, further comprising the step of providing a plurality of centrifugal collapse blocking members which move further away from a central portion of the gear body as a rotation rate of a gear body increases, so as to reduce inertia induced tooth collapse.

10. The method of claim 1, wherein said plurality of unidirectional collapsible teeth, the master input member, the first receiving shaft, second receiving shafts, and gears thereof, in combination, are configured such that each of the plurality of unidirectional collapsible teeth;
becomes erect under its own weight prior to encounter with non-unidirectional collapsible teeth;
collapses when a force is applied against the direction of the weight of the unidirectional tooth; and
remains erect when a force is applied toward the direction of the weight of the unidirectional tooth.

11. A system to harness wave energy comprising:
a buoy with a first concave portion, that catches a wave as it moves toward a first direction;
a mechanism to restore the buoy back to an original state, after the wave passes the buoy and a wave charge force subsides;
wherein the mechanism can be any of a spring, a hydraulic mechanism, and a weightlifting mechanism configured for accumulating energy and automatic releasing energy once energy accumulation subsides;
a tensile member connected with the buoy and said mechanism;
an alternating to direct motion converter for conversion of the alternating motion into unidirectional motion;
wherein said alternating to direct motion converter comprises:
a master input member configured to move in alternating directions;
a first receiving shaft;
a second receiving shaft;
a plurality of unidirectional collapsible gear teeth;
where said plurality of unidirectional collapsible gear teeth form an interface between the master input member; and the first receiving shaft;
the second receiving shaft;
where each of said plurality of unidirectional collapsible gear teeth collapse when pushed in a first direction relative to a tooth;
  remain erect when pushed in a second direction relative to the tooth;
  are disposed on at least one of a first gear and a second gear; and
where the master input member, the first receiving shaft, the second receiving shaft, the first gear, the second gear, and the plurality of unidirectional collapsible gear teeth, in combination, are configured such that
  a movement of the master input member in a first direction causes contact-induced collapse of unidirectional collapsible teeth between the master input member and the second receiving shaft, while transferring motion, via erect unidirectional collapsible teeth, from the master input member to the first receiving shaft; and
  a movement of the master input member in a second direction causes contact-induced collapse of unidirectional collapsible teeth between the master input member and the first receiving shaft, while transferring motion, via erect unidirectional collapsible teeth, from the master input member to the second receiving shaft;
    any of the plurality of unidirectional collapsible teeth become erect under its own weight prior to encounter with non-unidirectional collapsible teeth;
wherein unidirectional motion is transmitted to at least one of
  an energy storage apparatus;
  an electric generator for generation of electricity; and
  a centrifugal water pump for desalination methods.

12. An apparatus of converting directionally alternating motion to unidirectional motion comprising:
a master input member configured to move in alternating directions;
a first receiving shaft;
a second receiving shaft;
a plurality of unidirectional collapsible gear teeth;
wherein said plurality of unidirectional collapsible gear teeth form an interface between the master input member; and
  the first receiving shaft; and
  the second receiving shaft;
  wherein each of said plurality of unidirectional collapsible gear teeth collapse when pushed in a first direction relative to a tooth;
    remain erect when pushed in a second direction relative to the tooth;
    are disposed on at least one of a first gear and a second gear; and
  wherein the master input member, the first receiving shaft, the second receiving shaft, the first gear, the second gear, and the plurality of unidirectional collapsible gear teeth, in combination, are configured such that
    a movement of the master input member in a first direction causes contact-induced collapse of unidirectional collapsible teeth between the master input member and the second receiving shaft, while transferring motion, via erect unidirectional collapsible teeth, to the first receiving shaft; and
    a movement of the master input member in a second direction causes contact-induced collapse of unidirectional collapsible teeth between the master input member and the first receiving shaft, while transferring motion, via erect unidirectional collapsible teeth, to the second receiving shaft;
  wherein each tooth of the plurality of unidirectional collapsible gear teeth is configured to be erected under its own weight by rotation with respect to a pivot attached to a gear body; and
  wherein a unidirectional motion is transmitted to at least one of a group consisting of:
    an energy storage apparatus;
    an electric generator for generation of electricity; and
    a water pump for desalination.

13. The apparatus of claim 12, wherein the first gear is a first receiving gear on the first receiving shaft and the second gear is a second receiving gear disposed on the second receiving shaft; and said plurality of unidirectional collapsible gear teeth are disposed on said first receiving gear and said second receiving gear.

14. The apparatus of claim 13, wherein the master input member is a shaft allowed to rotate in alternating directions, further comprising a first master gear, composed on the master input member, with only non-collapsible teeth thereon.

15. The apparatus of claim 13, wherein the master input member is a shaft allowed to rotate in alternating directions, further comprising
a first master gear and a second master gear composed on said master input member;
wherein said first master gear is paired with said first receiving gear and said second master gear is paired with said second receiving gear; and
said first master gear and said second master gear are free of collapsible teeth thereon.

16. The apparatus of claim 12, wherein the master input member is a shaft allowed to rotate in alternating directions, the first gear is a first master gear on the master input member, and the second gear is a second master gear on the master input member, wherein each of the plurality of unidirectional collapsible gear teeth are disposed on said first master gear and second master gear;
wherein any of said plurality of unidirectional collapsible gear teeth on the first master gear are configured to be laterally inverted with respect to any of said plurality of unidirectional collapsible gear teeth on the second master gear; and
wherein a first receiving gear and a second receiving gear are free of any collapsible teeth thereon.

17. The apparatus of claim 12, further comprising:
a first gear, free of unidirectional collapsible teeth, disposed on said first receiving shaft;
a second gear, free of unidirectional collapsible teeth, disposed on said second receiving shaft (in addition to at least one of the first gear and the second gear); and
wherein said first gear is rotationally coupled to the second gear.

18. The apparatus of claim 12, further comprising a buoyant body at least partially submerged in a body of water, wherein the motion captured by the buoyant body is transmitted to the master input member.

\* \* \* \* \*